United States Patent
Ooshima et al.

(10) Patent No.: US 7,523,280 B2
(45) Date of Patent: Apr. 21, 2009

(54) STORAGE MANAGING SYSTEM, STORAGE MANAGING APPARATUS, AND STORAGE MANAGING METHOD

(75) Inventors: Hiroyoshi Ooshima, Yokohama (JP); Katsumi Iijima, Hachioji (JP); Yojiro Tagawa, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 11/271,479

(22) Filed: Nov. 10, 2005

(65) Prior Publication Data
US 2006/0107009 A1 May 18, 2006

(30) Foreign Application Priority Data
Nov. 18, 2004 (JP) ............................. 2004-334805

(51) Int. Cl.
*G06F 12/00* (2006.01)
(52) U.S. Cl. ..................................................... 711/163
(58) Field of Classification Search ................ None
See application file for complete search history.

(56) References Cited

U.S. PATENT DOCUMENTS

| 6,611,907 | B1 * | 8/2003 | Maeda et al. ............... 711/170 |
| 6,823,422 | B2 | 11/2004 | Maeda |
| 6,829,674 | B2 | 12/2004 | Maeda |
| 6,829,675 | B2 | 12/2004 | Maeda |
| 6,829,676 | B2 | 12/2004 | Maeda |
| 2005/0060513 | A1 | 3/2005 | Maeda |

FOREIGN PATENT DOCUMENTS

JP            2001-188701            7/2001

* cited by examiner

*Primary Examiner*—Brian R Peugh
(74) *Attorney, Agent, or Firm*—Canon U.S.A., Inc., IP Division

(57) ABSTRACT

A storage managing system and method, the system and method including matching a boundary of a cluster, which is a minimum data unit of a data region of a storage medium having a write protect function, with a boundary of at least one or more consecutive blocks each having a predetermined size, and applying write protection to data in units of the block.

41 Claims, 28 Drawing Sheets

FIG.9

| SIZE(Byte) | CONTENTS |
|---|---|
| 8 | OEM NAME |
| 2 | SECTOR SIZE |
| 1 | CLUSTER SIZE |
| 2 | RESERVE SECTOR NUMBER |
| 1 | FAT NUMBER |
| 2 | ROOT DIRECTORY ENTRY NUMBER |
| 2 | TOTAL SECTOR NUMBER |
| 1 | MEDIA DESCRIPTOR |
| 2 | FAT SIZE (SECTOR UNIT) |
| 2 | TRACK SIZE (SECTOR UNIT) |
| 2 | HEAD NUMBER |
| 4 | HIDDEN SECTOR NUMBER |
| 4 | 32BIT SECTOR NUMBER |
| 1 | DRIVE ID |
| 1 | RESERVE |
| 1 | BOOT SIGNATURE |
| 4 | SERIAL NUMBER |
| 11 | VOLUME NAME |
| 8 | FILE SYSTEM TYPE |

FIG.20

| PARAMETER | VALUE |
|---|---|
| TOTAL CAPACITY | 10M BYTES (20480 SECTORS) |
| SECTOR SIZE | 512 BYTES |
| WP BLOCK SIZE | 2k BYTES |

FIG.21

| PARAMETER | VALUE |
| --- | --- |
| SECTOR SIZE | 512 BYTES |
| CLUSTER SIZE | 8k BYTES |
| NUMBER OF RESERVE SECTORS | 2 SECTORS |
| NUMBER OF FAT | 2 |
| NUMBER OF ROOT DIRECTORY ENTRIES | 512 |
| TOTAL NUMBER OF SECTORS | 20480 SECTORS |
| FAT SIZE | 5 SECTORS |

FIG.23

CLUSTER START POSITION  *2301*

= START ADDRESS OF PARTITION  *2302*  *2304*  *2305*

+ (NUMBER OF RESERVE SECTORS + FAT SIZE × NUMBER OF FAT)

× SECTOR SIZE  *2303*

+ (NUMBER OF ROOT DIRECTORY ENTRIES × 32)

*2306*

STORAGE MANAGING SYSTEM, STORAGE MANAGING APPARATUS, AND STORAGE MANAGING METHOD

BACKGROUND OF THE INVENTION

1. Field of the Invention

The present invention relates to a storage managing system, a storage managing apparatus, and a storage managing method for managing data storage of a storage medium.

2. Description of the Related Art

Various detachable storage media are used, as storage devices for storing files, in personal computers, personal digital assistants (PDA), portable phones, digital still cameras and the like.

This kind of storage media cannot physically protect data stored therein, unlike a storage device that allows writing of data only one time, such as a compact disc-recordable (CD-R) being used for only one burning of data thereon. Thus, each user must be careful about protection of the stored data. More specifically, even when the data of a storage medium that is in a readable/writable condition can be managed and protected by specific software (e.g., a file system or the like), it is possible to cancel the protection applied to the data of this storage medium when other software is used for rewriting or deleting of data. Furthermore, the data managing software is determined depending on an apparatus receiving a storage medium. In this respect, the protecting method dependent on the type of software cannot assure reliable protection of the stored data. Furthermore, in any storage medium, all of the stored data is completely deleted when the storage medium is formatted.

However, it is a recent trend that advanced storage media have the capability of protecting stored data. For example, a Secure Digital (SD) memory card is a typical storage medium that has an entire write protect function for applying write protection to the entire data region of the storage medium. More specifically, the SD memory card is equipped with a special switch on its side surface to select either write protect ON or write protect OFF. When the write protect ON is selected, all of the data stored in the SD memory card is write protected. Furthermore, the SD memory card has a partial write protect function for applying write protection to a limited portion of the data region of the storage medium.

For example, the data region is divided into a plurality of units, which are generally referred to as WP blocks, each having a data size of, for example, 2 KB. The SD memory card, if it has the above partial write protect function, can apply write protection to each WP block. Japanese Patent Application Laid-open No. 2001-188701 discloses a technique for managing, for each cluster, deletion of stored data.

However, according to the above-described entire write protect function, the SD memory card is always required to apply write protection to the entire data region of the storage medium even when the write protection is required for only one file. This is very inefficient and inconvenient.

Furthermore, according to the above-described partial write protect function, usage of the data region will be inefficient unless the head of a file matches with the head of a WP block. Furthermore, in a case where data is stored in accordance with a file allocation table (FAT) file system, a file may be divided into clusters and file data may be separately stored in non-consecutive regions. Therefore, if a FAT or a directory entry, which is required to identify the position of each file, is changed by formatting or updating of the FAT, it will be impossible to restore the file.

SUMMARY OF THE INVENTION

The present invention has been made in consideration of the above situation, and is directed to a storage managing system, a storage managing apparatus, and a storage managing method, capable of efficiently applying write protection to each block of a data region of a storage medium.

In one aspect of the present invention, a storage managing system for managing data storage of a storage medium includes a write protecting unit, and a block boundary matching unit. The write protecting unit is configured to apply write protection to data in units of a block having a predetermined size. The block boundary matching unit is configured to match a boundary of a cluster, which is a data unit in a data region of the storage medium, with a boundary of at least one or more consecutive blocks.

In another aspect of the present invention, a storage managing method for managing data storage of a storage medium includes a block boundary matching step, and a write protecting step. The block boundary matching step is for matching a boundary of a cluster, which is a data unit in a data region of the storage medium, with a boundary of at least one or more consecutive blocks each having a predetermined size. The write protecting step is for applying write protection to data in units of the block.

In a further aspect of the present invention, a storage managing apparatus for managing data storage of a storage medium includes a control unit and a block boundary matching unit. The control unit is configured to control a storage medium that is capable of applying write protection to data in units of a block having a predetermined size. The block boundary matching unit is configured to match a boundary of a cluster, which is a minimum data unit in a data region of the storage medium, with a boundary of at least one or more consecutive blocks.

In a further aspect of the present invention, a storage managing method for managing data storage of a storage medium includes a block boundary matching step and a control step. The block boundary matching step is for matching a boundary of a cluster, which is a minimum data unit in a data region of a storage medium that is capable of applying write protection to data in units of a block having a predetermined size, with a boundary of at least one or more consecutive blocks. The control step is for controlling write protection applied to a storage medium having a block whose boundary is matched by the block boundary matching step.

In a further aspect of the present invention, a storage managing apparatus for managing data storage of a storage medium that is capable of applying write protection to data in units of a block having a predetermined size includes a calculating unit and a formatting unit. The calculating unit is configured to calculate a parameter required to match a boundary of a cluster, which is a minimum data unit in a data region of the storage medium, with a boundary of at least one or more consecutive blocks. The formatting unit is configured to format the storage medium based on the parameter calculated by the calculating unit.

In a further aspect of the present invention, a storage managing method for managing data storage of a storage medium that is capable of applying write protection to data in units of a block having a predetermined size includes a calculating step and a formatting step. The calculating step is for calculating a parameter required to match a boundary of a cluster, which is a minimum data unit in a data region of the storage medium, with a boundary of at least one or more consecutive blocks. The formatting step is for formatting the storage medium based on the parameter calculated by the calculating step.

Further features of the present invention will become more apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a table showing parameters contained in a BIOS parameter block (BPB) shown in FIG. 8.

FIG. 20 is a diagram showing an example of inherent parameters of the SD memory card in accordance with the first embodiment of the present invention.

FIG. 21 is a table showing an example of BPB parameters in a case where a WP block boundary matching is applied to the SD memory card having the parameters shown in FIG. 20.

FIG. 23 shows a formula to calculate a cluster starting address according to the FAT16 file system.

DETAILED DESCRIPTION OF THE EMBODIMENTS

Exemplary embodiments of the invention will be described in detail below with reference to the attached drawings.

First Exemplary Embodiment

Figure 1:
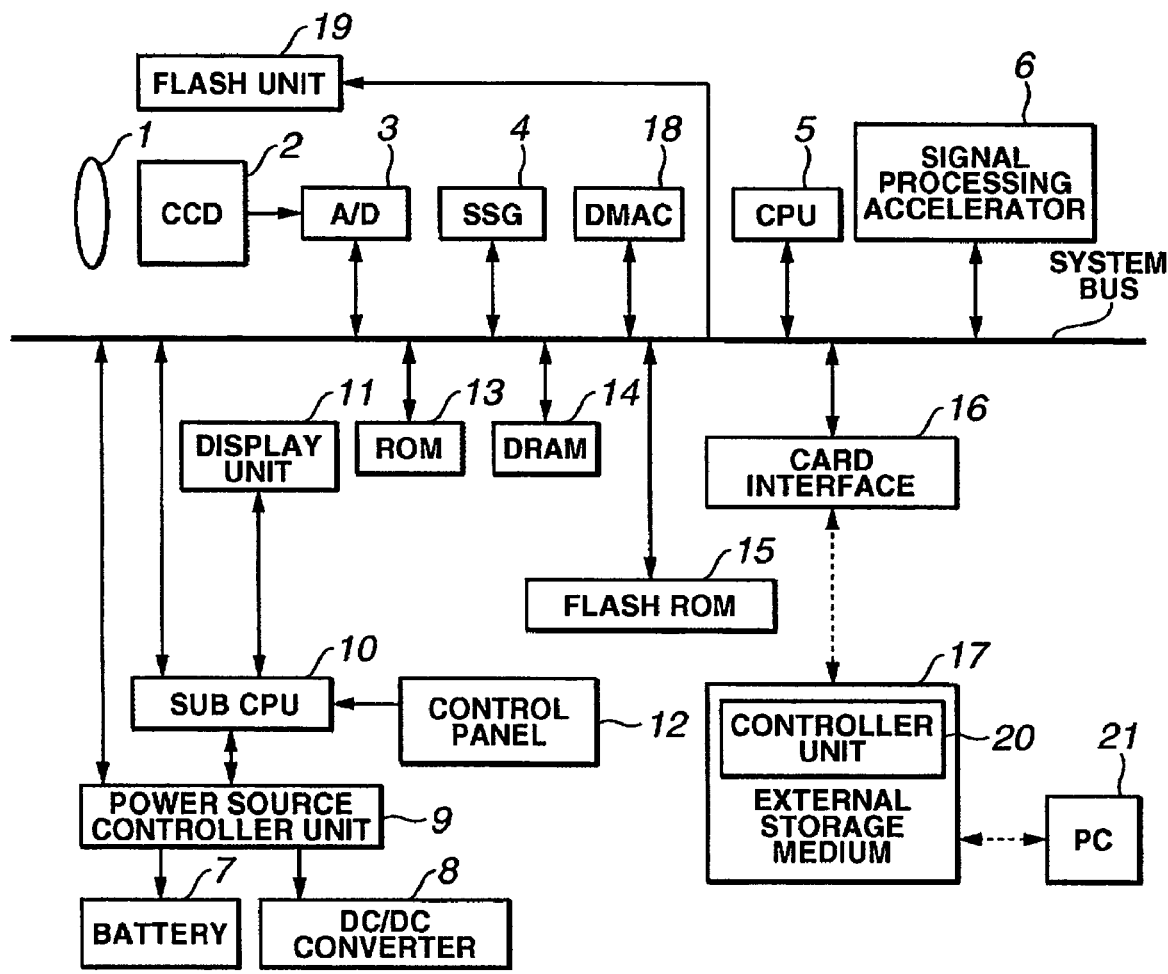
FIG. 1 is a block diagram showing one example of an image processing system that can incorporate a file management unit in accordance with a first embodiment of the present invention.

FIG. 1 is a block diagram showing an exemplary arrangement of a digital camera and an external storage medium to which the present invention is applicable. The digital camera uses an SD memory card 17 as an external storage medium that is detachable from the camera. The SD memory card 17 includes a built-in controller unit 20 that executes a write protecting operation (to be described later). Furthermore, the SD memory card 17 is connectable with a personal computer (PC) 21, which can utilize the SD memory card 17.

The digital camera includes a lens 1, a charge-coupled device (CCD) unit 2, an analog-to-digital (A/D) converter 3, a synchronization signal generator (SSG) unit 4, and a central processing unit (CPU) 5. The CCD unit 2 outputs an electrical signal representing the light having passed through the lens 1. The A/D converter 3 converts the analog signal produced from the CCD unit 2 into a digital signal. The SSG unit 4 supplies a synchronization signal to the CCD unit 2 and to the A/D converter 3. The CPU 5 implements various controls of the digital camera. The CPU 5 has the capability of functioning as an SD card driver and also performs a format control for matching block boundaries (to be described later).

Furthermore, the digital camera includes a signal processing accelerator 6, a battery 7, a DC/DC converter 8, a power source controller unit 9, a sub CPU 10, a display unit 11, and a control panel 12. The signal processing accelerator 6 implements speedy signal processing. The DC/DC converter 8 supplies electric power of the battery 7 to the whole digital camera. The power source controller unit 9 controls the DC/DC converter 8. The sub CPU 10 performs controls relating to the control panel 12, the display unit 11, and the battery 7. The display unit 11 is a device, such as a liquid crystal panel, which has the capability of informing a user of various information or data. The control panel 12 includes a release switch and a menu button that the user can directly operate or manipulate.

Furthermore, the digital camera includes a read-only memory (ROM) 13, a dynamic random access memory (DRAM) 14, a flash ROM 15, a card interface 16, a direct memory access (DMA) controller 18, and a flash unit 19 in addition to the above-described SD memory card (external storage medium) 17. ROM 13 stores system programs such as an OS. The DRAM 14 is a main memory of the digital camera.

The flash ROM 15 is usable as a built-in storage medium. The card interface 16 is provided for the SD memory card 17. The SD memory card 17 is used as an external storage medium.

The functions of the digital camera in a photographing operation will be explained below. When a user presses the release switch on the control panel 12, the CPU 5 starts a predetermined photographing sequence in response to this action. The following operations are all implemented by the control of the CPU 5.

More specifically, when the release switch is pressed, the SSG 4 activates the CCD 2. An analog signal produced from the CCD 2 is converted into a digital signal by the A/D converter 3. An output of the A/D converter 3 is transferred to the DRAM 14 in DMA fashion by the DMA controller 18. At the time the DMA transferring of 1 frame is accomplished, the CPU 5 starts a signal processing sequence.

The signal processing sequence includes a step of reading a signal processing program out of the flash ROM 15 and storing the readout program in the main memory (DRAM 14), and a step of transferring the data of the main memory 14 to the signal processing accelerator 6 to execute signal processing. The signal processing accelerator 6 performs part of the signal processing and functions as a calculating circuit that assists time-consuming processing performed by the CPU 5. To this end, the signal processing accelerator 6 operates in cooperation with processing software of the CPU 5. When the signal processing is partly or thoroughly accomplished, the processed data is sent as an image file to the SD memory card 17 via the card interface 16 and is stored in the SD memory card 17. In this case, the CPU 5 or the signal processing accelerator 6 compresses the image file if compression is required for the file format.

Figure 2:
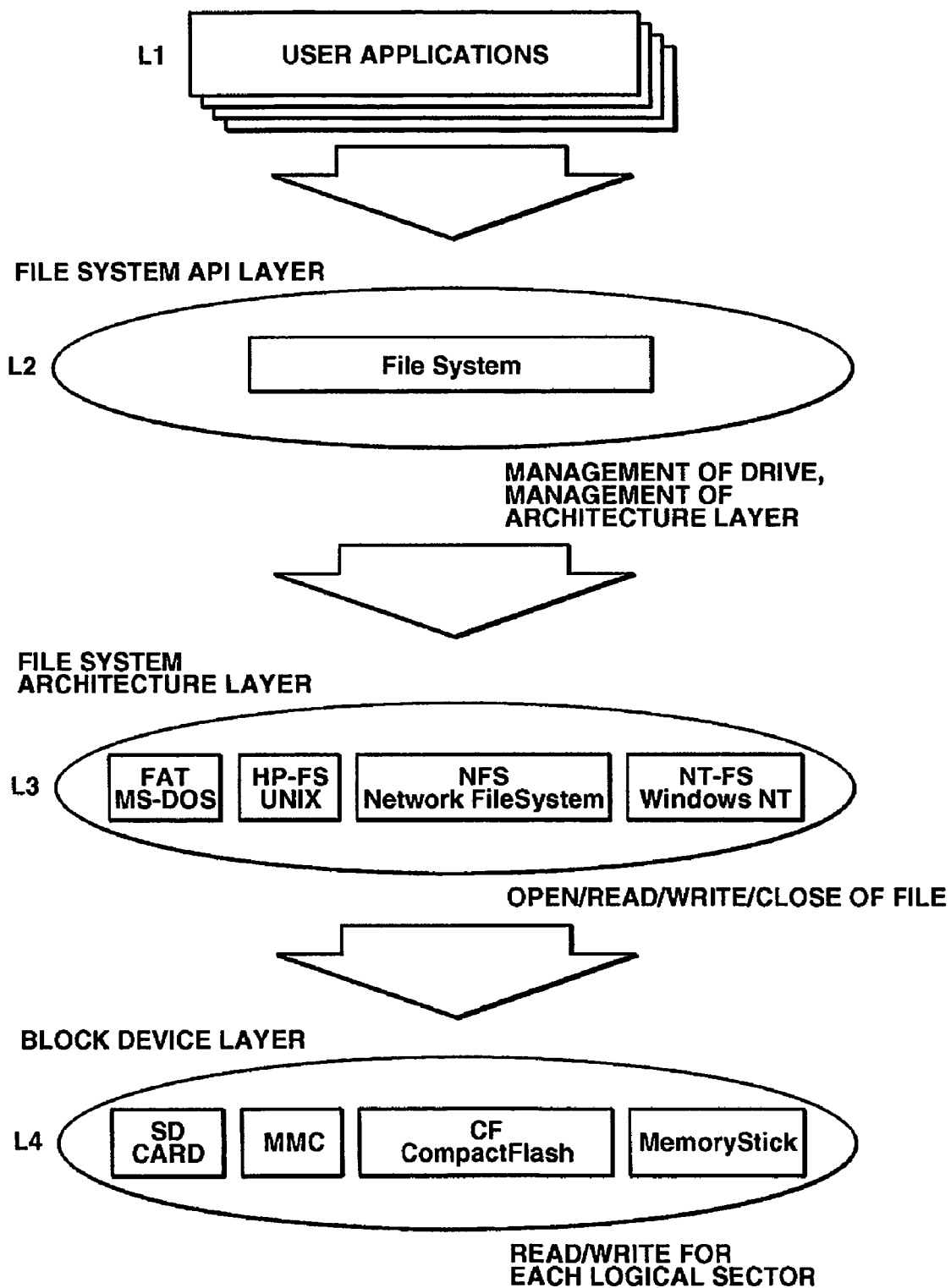
FIG. 2 is a diagram schematically showing a hierarchical structure of a file system recorded on an SD memory card shown in FIG. 22.

FIG. 2 is a diagram schematically showing a hierarchical structure of the image file system stored in the SD memory card 17 shown in FIG. 1. For example, the image file system includes layers L1 to L4.

In FIG. 2, the highest layer L1 is user applications that are software activated in the digital camera. Each file is opened by designating a file name and is closed after finishing reading/writing operation. The second layer L2 is a file system API (application programming interface) layer that is called by a function call sent from the user application. The layer L2 manages a drive name in relation to a file system. As a file system architecture layer (layer L3) is mounted for each drive, a plurality of file system architectures (e.g., FAT, HP-FS, NFS, NTFS, etc) can be mixed. The file system architecture layer performs actual file management. The lowest layer L4 is a block device layer.

The file system architecture layer L3 implements a file input/output operation by utilizing the service provided by the block device layer L4. The data managed by the block device layer L4 is divided into sector units of, for example, 512 bytes. The block device layer L4 absorbs differences in the input/output control of various devices and differences in the parameters such as heads and cylinders. Accordingly, a digital camera can be organized to simultaneously include various kinds of devices.

According to the digital camera of the first embodiment, the block device layer L4 of the SD memory card 17 provides the following two services for the file system.

(A.1) reading of data from a sector designated by a logical sector number.

(A.2) writing of data into a sector designated by a logical sector number.

Figure 5:
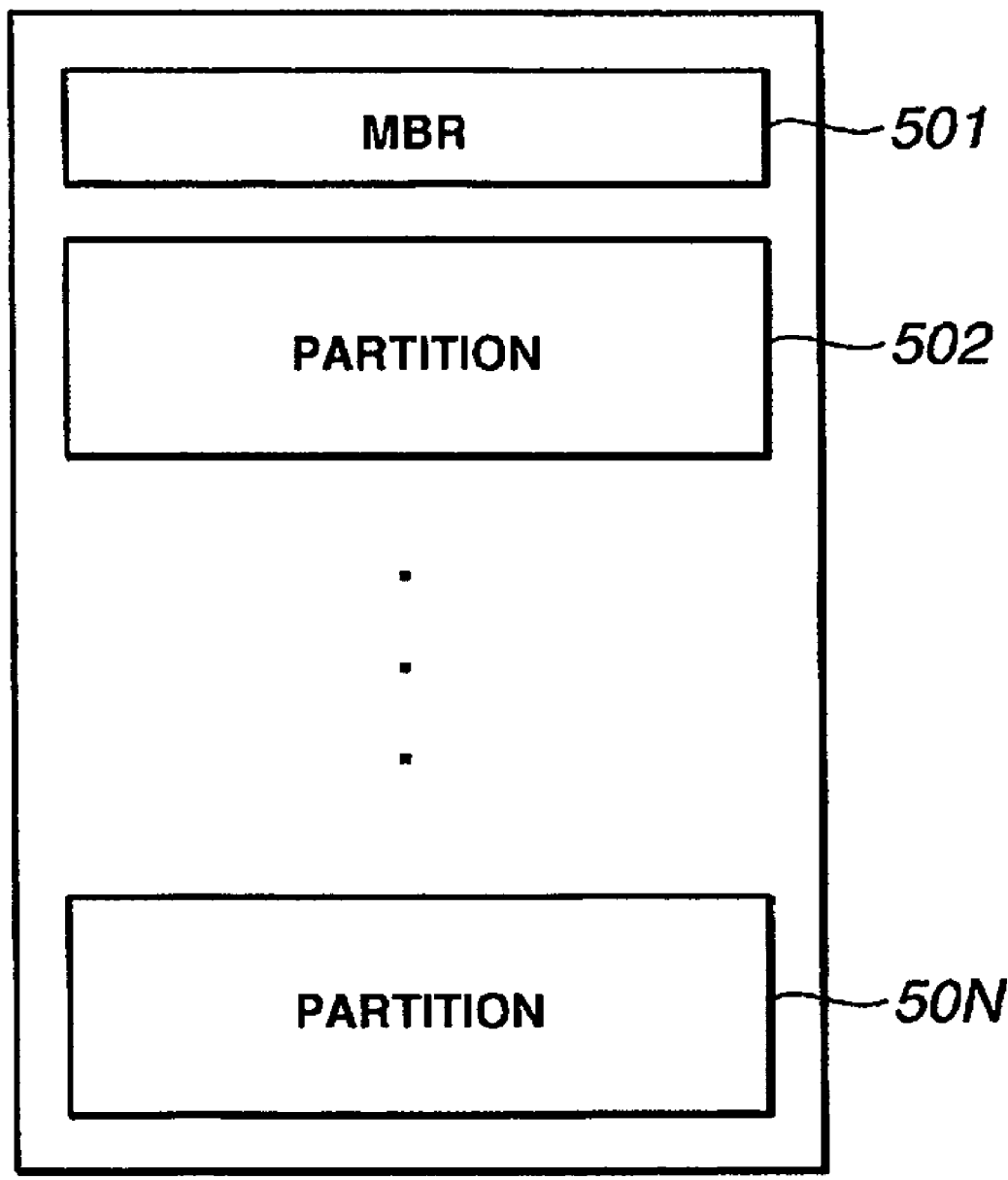
FIG. 5 is a diagram showing a general internal data structure of the SD memory card.
Figure 6:
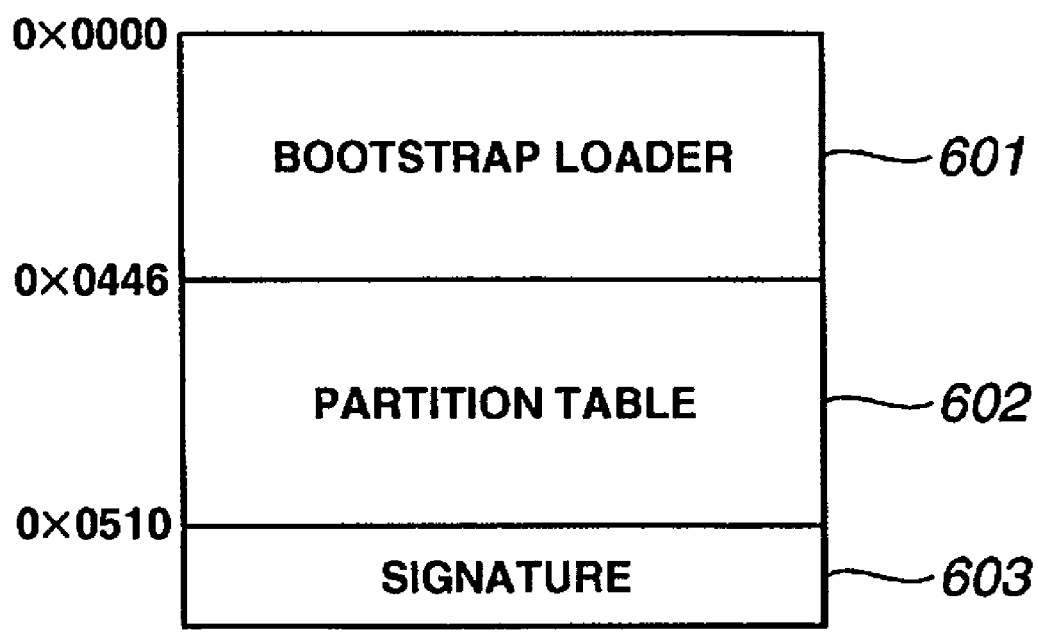
FIG. 6 is a diagram showing an internal data structure of a master boot record (MBR) shown in FIG. 5.

The data structure of a storage medium and a FAT file system will be described below. FIG. 5 shows a data structure of the storage medium. In FIG. 5, a master boot record (MBR) 501 has a data size of 512 bytes occupying the leading portion of the storage medium. FIG. 6 shows the structure of the MBR 501. When the storage medium is a type that can be started, it has a bootstrap loader 601 and a start program of the storage medium. When the storage medium is a type that cannot be started, it has no bootstrap loader. The bootstrap loader 601 occupies 446 bytes from the leading portion of the MBR 501. A partition table 602, storing information of partitions 502 to 50N of the storage medium, occupies a total of 64 bytes from the 447th to 510th byte of the MBR 501. A SIGNATURE 603 indicates whether the MBR 501 is valid or not.

One partition is managed by one file system. One storage medium is composed of at least one partition. The partition table 602 stores physical start and end positions, a logical start position, and a total sector number of each partition. As an exception, there may be no MBR 501 if there is only one partition. In this case, the entire storage medium is regarded as one partition.

Figure 7:
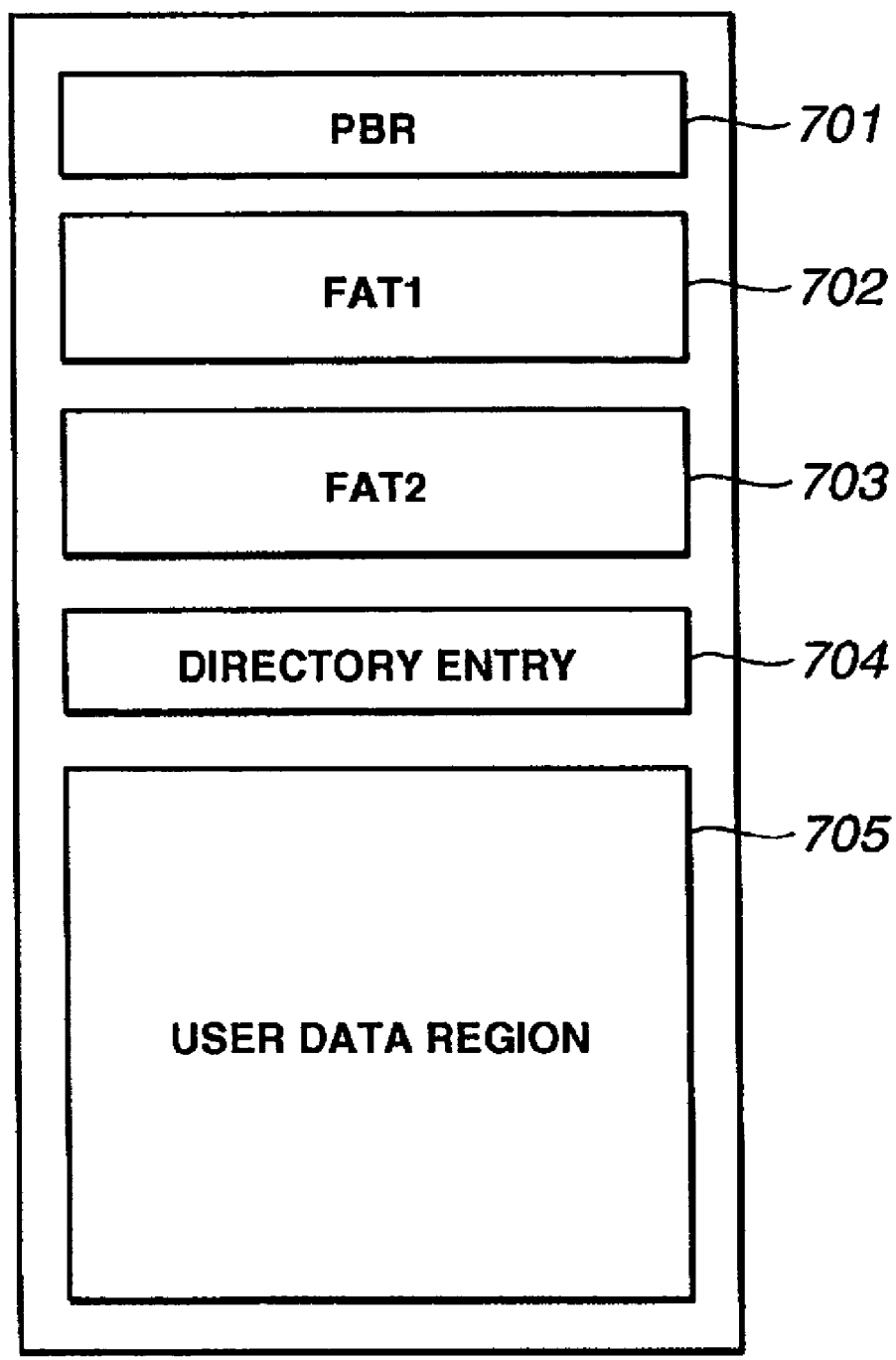
FIG. 7 is a diagram showing an internal data structure of a partition shown in FIG. 5 that is formatted in accordance with a FAT file system.
Figure 8:
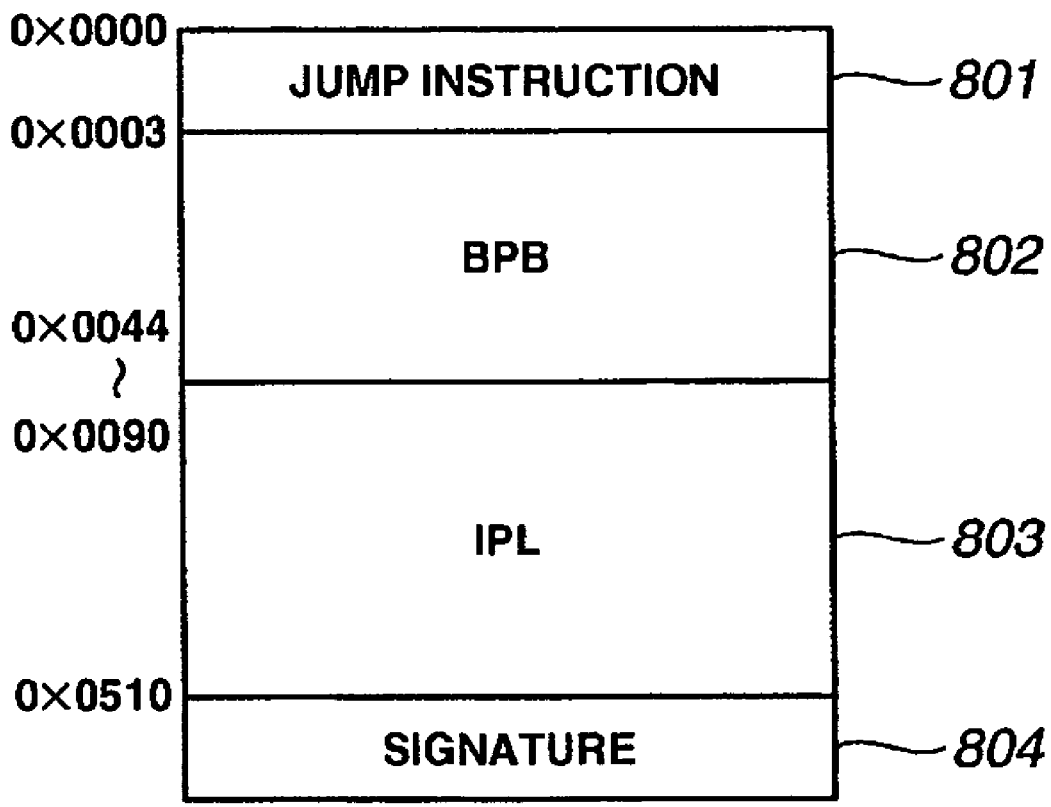
FIG. 8 is a diagram showing an internal data structure of a partition boot record (PBR) shown in FIG. 7.

The data structure of a partition logically formatted in accordance with the FAT file system will be described below. FIG. 7 shows a data structure formatted in accordance with the FAT16 file system. A partition boot record (PBR) 701 has a structure shown in FIG. 8. A jump instruction 801 shown in FIG. 8 stores a jump instruction to an initial program loader (IPL) 803. Information specialized to the partition, that is, handled by the file system is recorded in a BIOS parameter block (BPB) 802. FIG. 9 shows parameters contained in the BPB 802. The IPL 803 stores a start program of the partition.

In FIG. 7, two FATs (file allocation tables) 702 and 703 are provided to hold file position information stored in a user data region 705. These FATs 702 and 703 allow the FAT file system to obtain file position information stored in the partition. In this respect, even if a file is stored in the user data region 705, the file will not be recognized as a file unless the position information of the file is stored in the FATs 702 and 703. The data stored in the FAT1 702 is identical with the data stored in the FAT2 703. One FAT can be utilized as a backup of the other FAT. A root directory entry 704 stores management information of the file stored in a root directory. The user data region 705 stores a file body.

The SD memory card 17 according to the first exemplary embodiment does not have the above-described MBR 501. The entire data region is arranged as one partition. This partition is formatted and managed in accordance with the FAT16 file system. The operation for writing a file into the SD memory card 17 or reading the file from the same will be described below.

Figure 10:
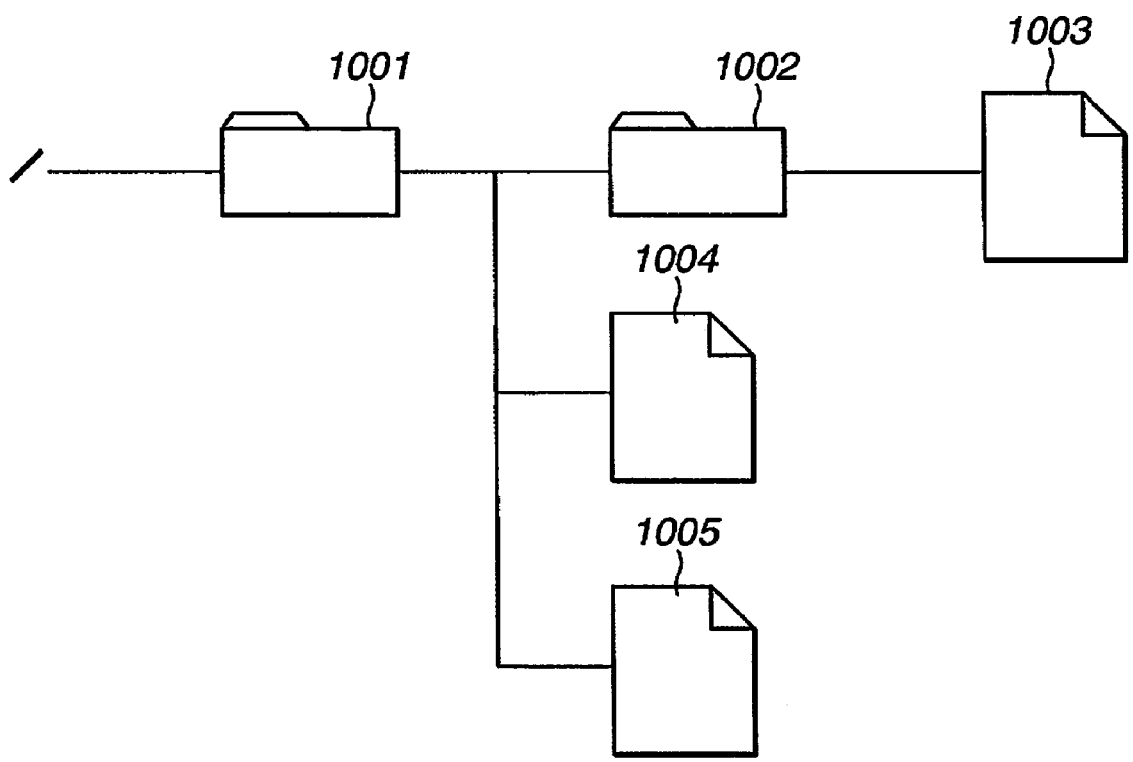
FIG. 10 is a state diagram exemplarily showing the condition of data regions of an SD memory card.

FIG. 10 shows the condition of data in the SD memory card 17, including a root directory 1001, a directory 1002, and files 1003, 1004, and 1005. The directory 1002 and two files 1004 and 1005 are stored in the root directory 1001. The file 1003 is stored in the directory 1002.

Figure 11:
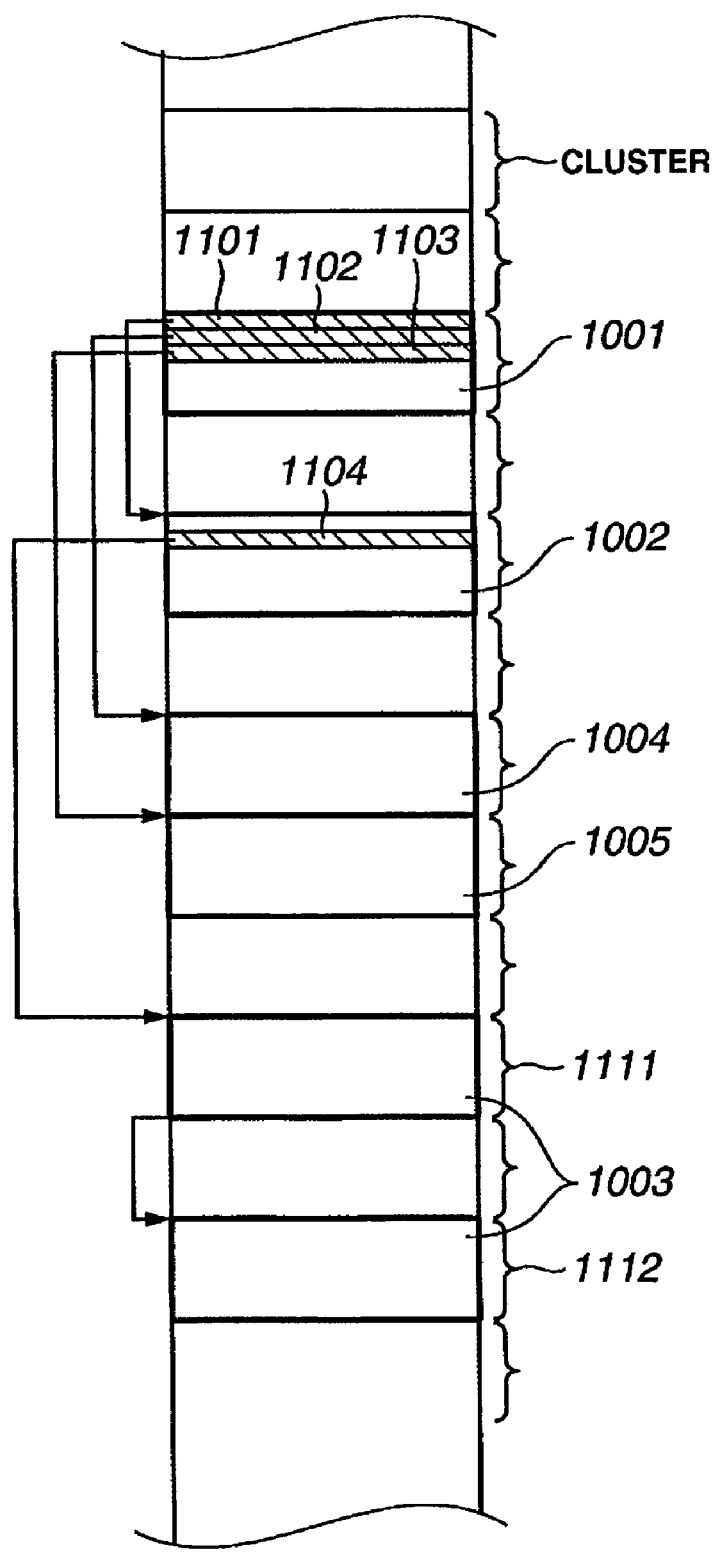
FIG. 11 is a structural diagram showing a data structure of the SD memory card in the condition shown in FIG. 10.

FIG. 11 shows the data structure of the SD memory card 17 in the present case. In FIG. 11, the same elements as those shown in FIG. 10 are denoted by the same reference numerals as in FIG. 10, although the directory is referred to as 'directory entry' in the data structure. Entry items 1101, 1102, and 1103 respectively indicate the storage locations of the directory 1002 and the files 1004 and 1005 stored in the root directory 1001. Similarly, an entry item 1104 indicates the storage location of the file 1003 stored in the directory 1002.

A directory entry and a file are stored in units of the size, for example 8 KB, determined according to the cluster size (see FIG. 9) which is a parameter in the above-described BPB 802. A plurality of clusters will be used to store the directory entry or the file, if it has a data amount equal to or larger than 1 cluster. The above-described FAT stores a used status of each cluster and link information between clusters. Two clusters 1111 and 1112 are used to store the file 1003. Whether a file is stored in consecutive clusters or in non-consecutive clusters is determined depending on the cluster used status in the SD memory card 17.

A file reading function for reading out file data will be explained below with reference to a case where the file 1003 stored in the directory 1002 is read out. The file system software processes all of the data read/write instructions by utilizing the above-described services (A.1) and (A.2). In the present case, the cluster number of a cluster in which the directory entry of the directory 1002 is stored is known.

Figure 12:
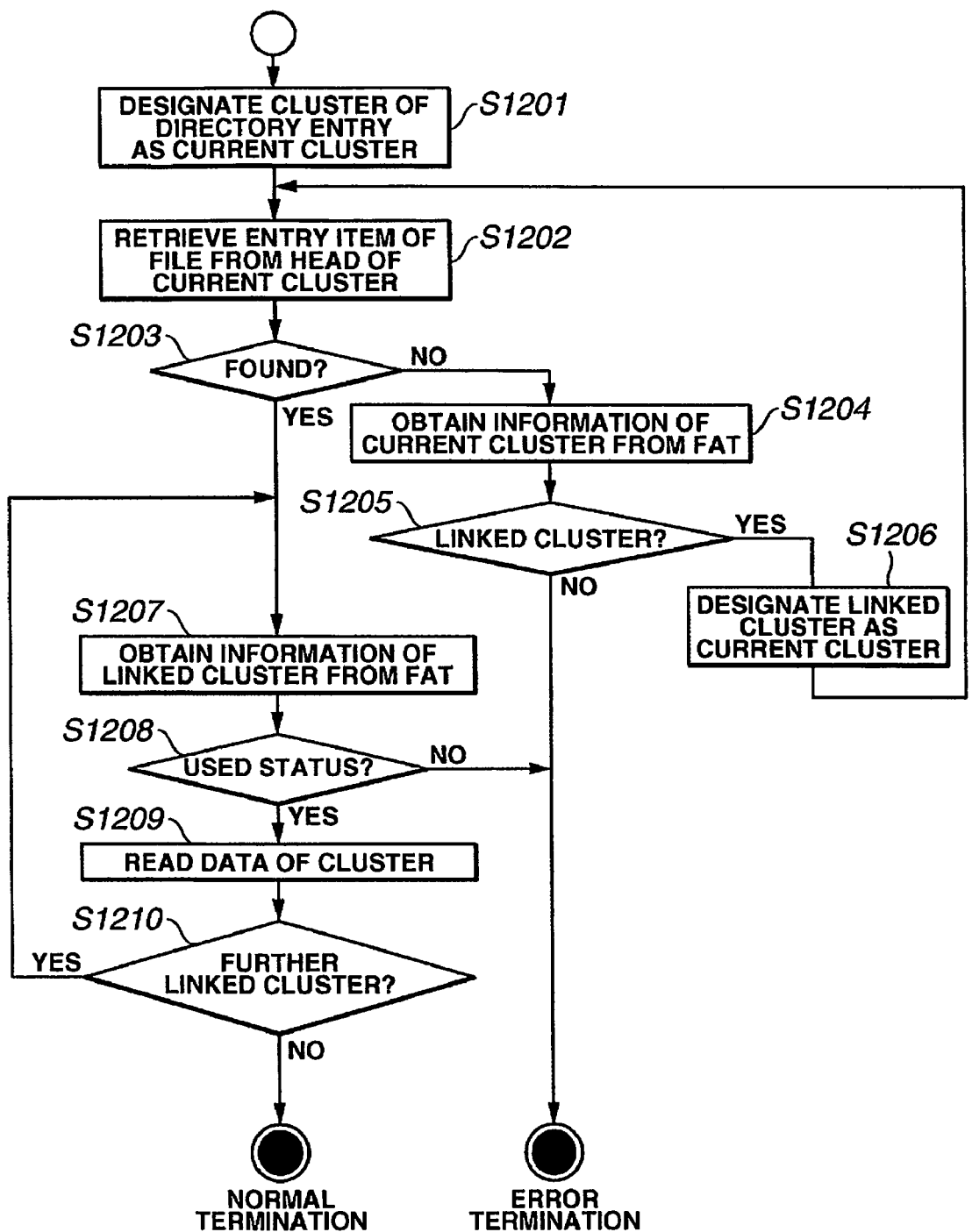
FIG. 12 is a flowchart diagram showing a file reading procedure for the SD memory card.

FIG. 12 is a flowchart showing the file reading function of the present embodiment. First, the file system software starts with step S1201 that executes the processing of designating the cluster of the directory 1002 as a current cluster. Then, step S1202 executes the processing of retrieving an entry item of the file 1003 from the head of the current cluster. Next, in step S1203, a determination is made whether the entry item has been found. When the entry item has not been found, step S1204 executes the processing of obtaining link information of the current cluster from the FAT. Then, in step S1205, a determination is made based on this link information whether the current cluster is linked. When there is any linkage, step S1206 executes the processing of newly designating a linked cluster as a new current cluster. Then, the file system software returns to step S1202 and repeats the above-described processing.

When the entry item of the file 1003 has been found in step S1203, the file system software proceeds to step S1207 to access the FAT to read information of a cluster linked with the entry item. The readout information includes the status of usage and linkage with respect to the linked cluster. Then, step S1208 executes the processing of checking the used status of the linked cluster based on this information. When the linked cluster is in a used state, the file system software proceeds to step S1209 to read out the data of this cluster. Then, in step S1210, a determination is made whether this cluster is further linked. When any other linkage has been found in step S1210, the file system software returns to step S1207 and repeats the above-described reading operation. When no linkage has been found in the step S1210, this routine ends as normal termination. When there is no linkage in step S1205, or when the linked cluster is in an unused state in step S1208, it is determined that no file is present or the file is broken. Then, this routine ends as error termination.

A file writing function for writing file data will be explained below with reference to a case where a file is produced for the directory 1002 and the data is written into this file. The file system software processes all of the data read/write instructions by utilizing the above-described services (A.1) and (A.2). In the present case, the cluster number of a cluster in which the directory entry of the directory 1002 is stored is known.

Figure 13:
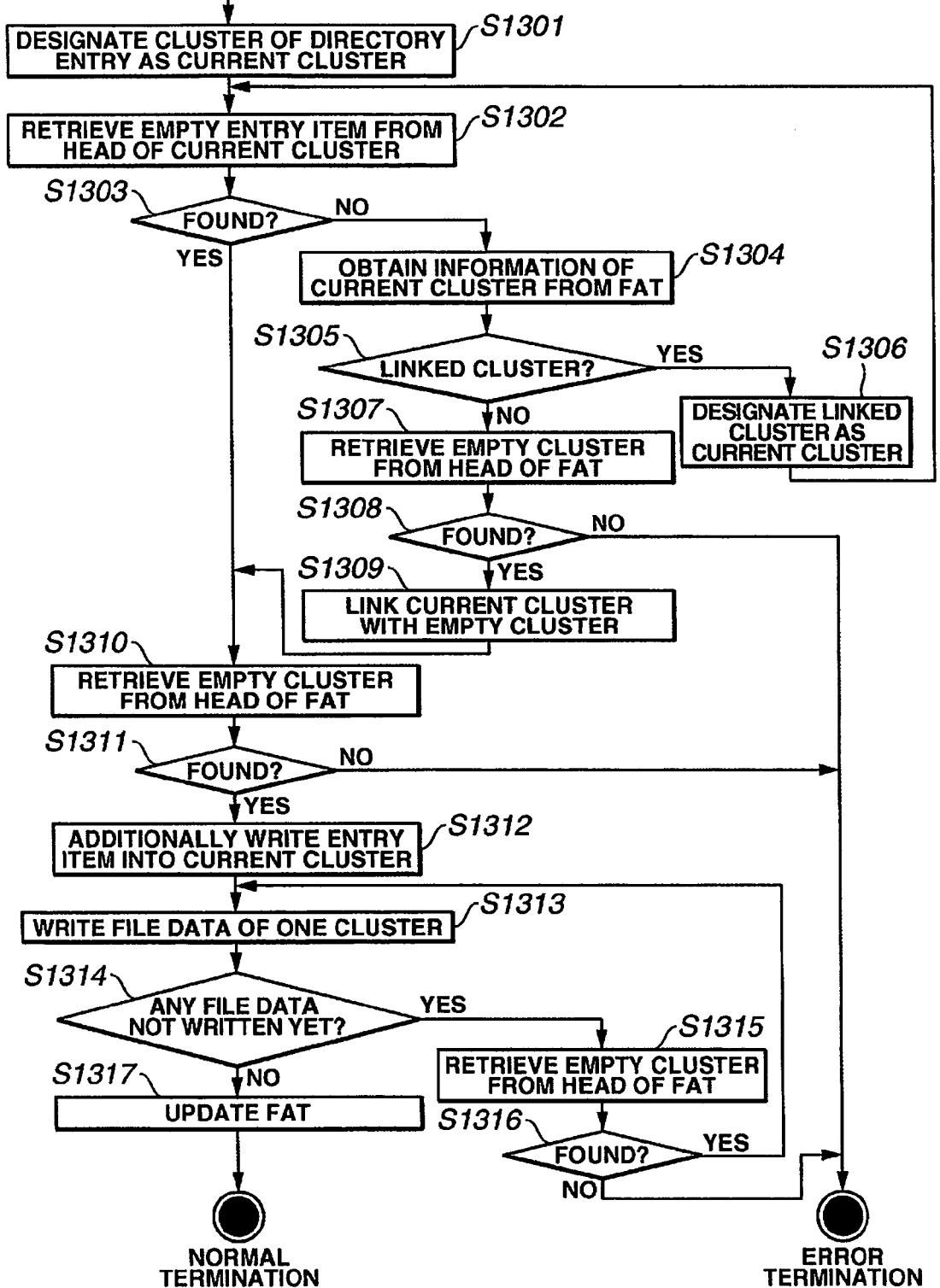
FIG. 13 is a flowchart diagram showing a file writing procedure for the SD memory card.

FIG. 13 is a flowchart showing the file writing function of the present embodiment. First, the file system software starts with step S1301 that executes the processing of designating a cluster storing the directory entry of the directory 1002 as a current cluster. Then, step S1302 executes the processing of successively reading directory entry items of the current cluster from the head thereof to retrieve an empty entry item. Then, in step S1303, a determination is made whether any empty entry item has been found. When no empty entry item has been found, the file system software proceeds to step S1304 to obtain link information of the current cluster. Then, a determination is made in step S1305 based on the obtained link information whether the current cluster is linked. When there is any linkage, the file system software proceeds to step S1306 to newly designate a linked cluster as a new current cluster. Then, the file system software returns to step S1302 and repeats the above-described processing.

When no linkage is detected in step S1305, a new empty cluster is linked as a directory entry region of the directory 1002 for the purpose of expansion. To this end, first, step S1307 executes the processing of successively reading the FAT from the head thereof to retrieve an empty cluster. Next, a determination is made in step S1308 whether any empty cluster has been found. When any empty cluster has been found, the file system software proceeds to step S1309 to link the current cluster with a found empty cluster and modify the FAT so as not to link the empty cluster with any cluster. Furthermore, the current cluster is replaced with the found empty cluster.

When any empty entry item has been found instep S1303, or when modification of the FAT has been executed in step S1309, the file system software proceeds to step S1310 to check the presence of any file data writing region. To this end, the FAT is successively read from the head thereof to retrieve an empty cluster. Furthermore, a determination is made in step S1311 whether any empty cluster has been found. When any empty cluster has been found, the file system software proceeds to step S1312 to additionally write an entry item having link information relating to this cluster into the directory entry of the current cluster. In a case where a new cluster has been linked in step S1309, an entry item is written to the head of the current cluster. Subsequently, step S1313 executes the processing of writing file data of one cluster into the empty cluster. Then, in step S1314, a determination is made whether there is any file data that is not written yet.

When there is any file data that is not written yet, the file system software proceeds to step S1315 to retrieve an empty cluster from the FAT. Then, in step S1316, a determination is made whether any empty cluster was found. When any empty cluster has been found, the file system software returns to step S1313 to repeat the above-described writing operation. When the determination result of step S1314 shows that writing of all of the file data has been already finished, the file system software proceeds to step S1317 to update the FAT so that the clusters to which file data is written are successively linked although the final cluster is not linked. Then, this routine ends as normal termination. When no empty cluster has been found in steps S1308, S1311, and S1316, this routine ends as error termination.

A file deleting function for deleting file data according to the present embodiment will be explained below with reference to a case where the file 1003 in the directory 1002 is deleted. The file system software processes all of the data read/write instructions by utilizing the above-described services (A.1) and (A.2). In the present case, the cluster number of a cluster in which the directory entry of the directory 1002 is stored is known.

Figure 14:
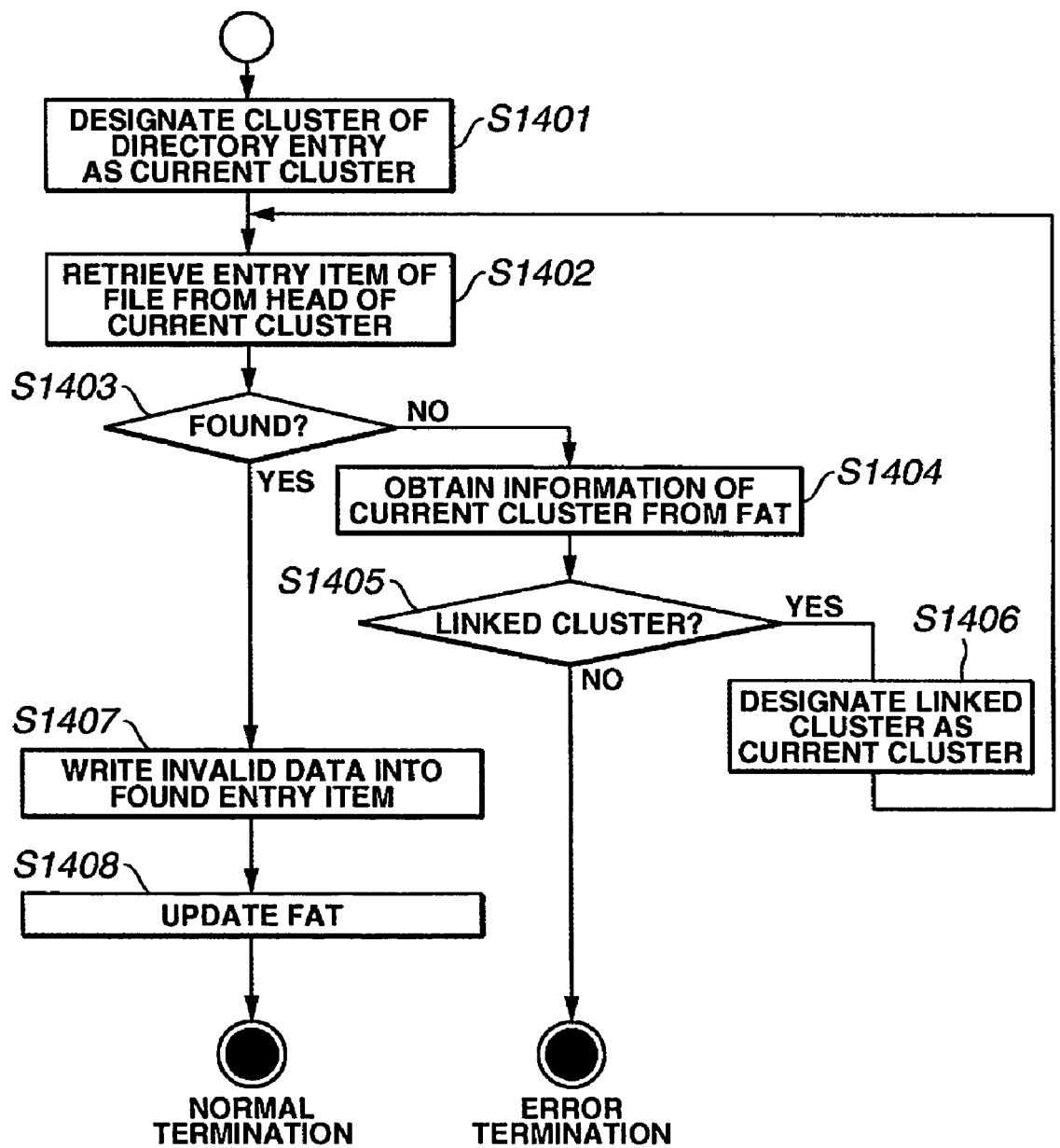
FIG. 14 is a flowchart diagram showing a file deleting procedure for the SD memory card.

FIG. 14 is a flowchart showing the file deleting function of the present embodiment. First of all, the file system software starts with step S1401 that executes the processing of designating a cluster of the directory 1002 as a current cluster. Then, step S1402 executes the processing of retrieving an entry item of the file 1003 from the head of the current cluster. Next, in step S1403, a determination is made whether the entry item has been found. When the entry item has not been found, the file system software proceeds to step S1404 to obtain link information of the current cluster from the FAT. Then, in step S1405, a determination is made based on this link information whether the current cluster is linked. When the current cluster is linked, the file system software proceeds to step S1406 to designate a linked cluster as a new current cluster and then returns to step S1402 to repeat the above-described processing.

When the entry item of the file 1003 has been found in step S1403, the file system software proceeds to step S1407 to write invalid data into the found entry item. Then, step S1408 executes the processing of updating the FAT so as to change all of the clusters that are used by the file 1003 into unused regions. Then, this routine ends as normal termination. When there is no linkage in step S1405, it is determined that no file is present. Then, this routine ends as error termination.

Figure 19:
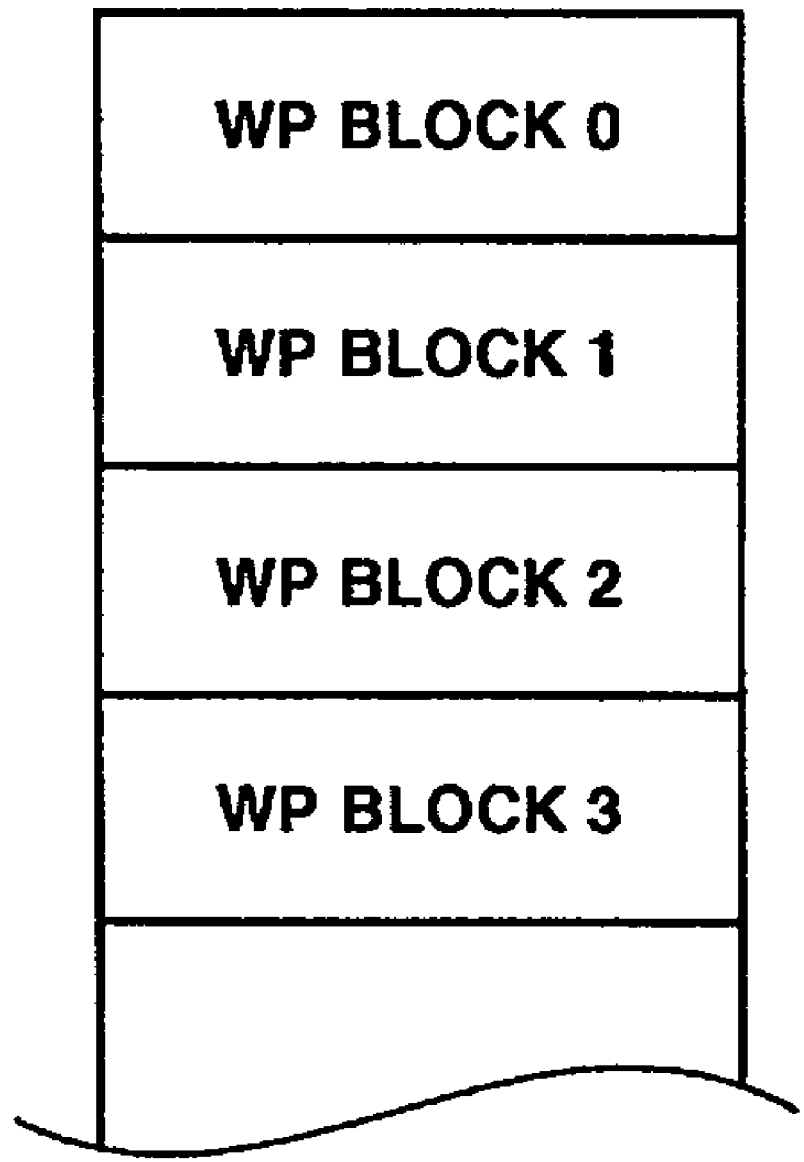
FIG. 19 is a data structural diagram showing a WP block allocation structure in the SD memory card.

A write protect function of the SD memory card will be explained below. The SD memory card has the capability of applying write protection to at least part of a data region in units of a so-called WP block. The size of a WP block is in a range from 1 sector to $2^{14}$ sectors. Like the sector size, the WP block size takes a value inherent to the card. As shown in FIG. 19, the data region has a plurality of WP blocks successively allocated as fixed regions from the head of the data region. A unique WP block address is allocated to each WP block.

The operation performed for the WP block includes the following three operations:

(B.1) applying write protection to a designated WP block.
(B.2) canceling write protection applied to a designated WP block.
(B.3) checking a write protected condition of a designated WP block.

To execute each operation, the SD card driver transmits a command to the SD memory card 17, and the controller unit 20 processes this command. Each operation will be explained below.

Figure 15:
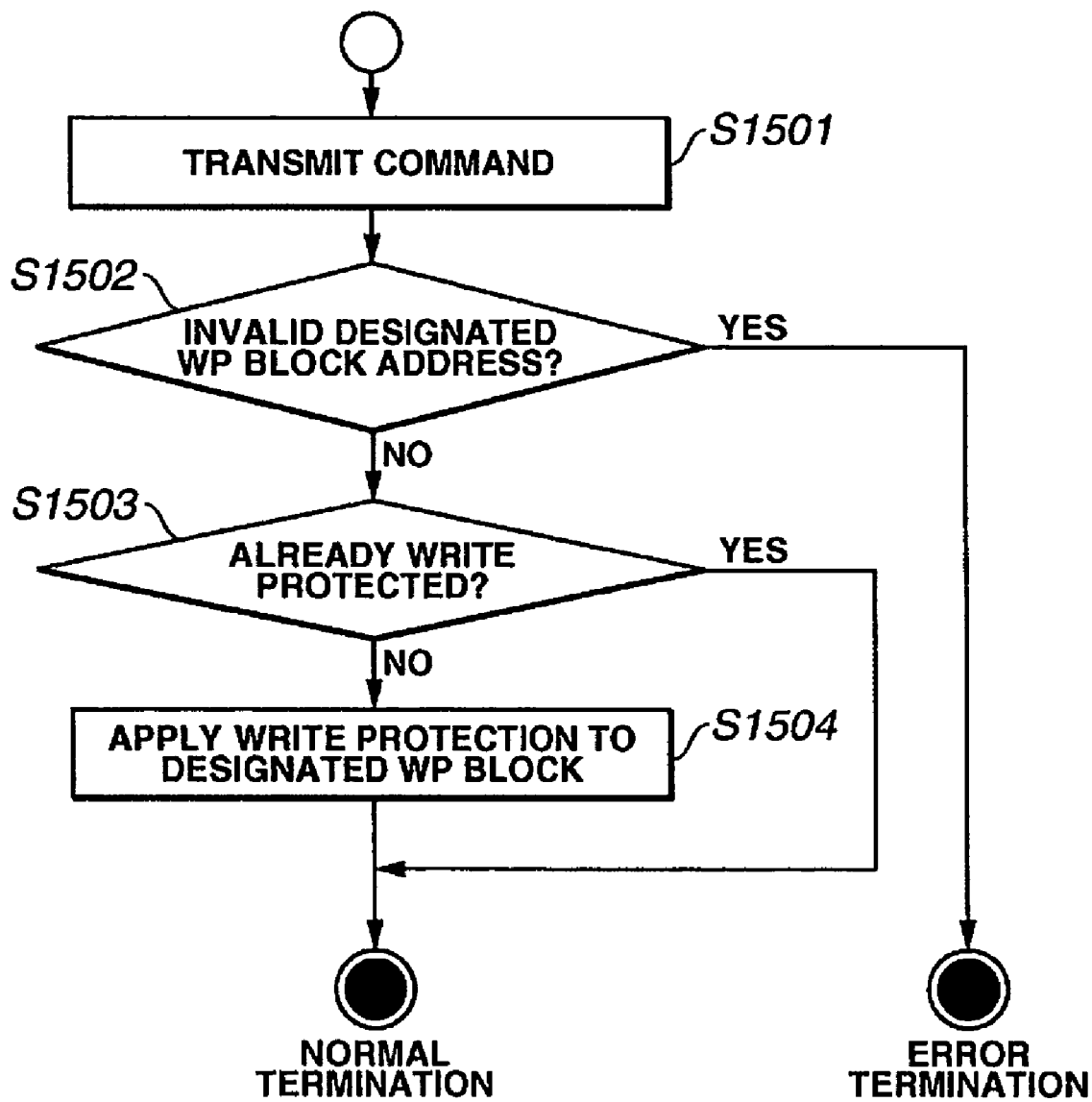
FIG. 15 is a flowchart diagram showing a write protecting procedure of the SD memory card.

FIG. 15 is a flowchart showing the above-described write protection operation (B.1). First, in step S1501, the SD card driver transmits a write protection requesting command to the SD memory card 17. This command contains a WP block address of a WP block that should be write protected. The controller unit 20, upon receipt of this command, makes a determination in step S1502 whether a designated WP block address is in a valid range. When the designated WP block address is in a valid range, a further determination is made in step S1503 whether the WP block of the designated WP block address is currently write protected.

When the WP block is not currently write protected, the controller unit 20 applies write protection to the WP block of the designated WP block address in step S1504. Then, this routine ends as normal termination. When the determination of step S1503 shows that the WP block of the designated WP block address is currently write protected, this routine ends as normal termination. When the determination of step S1502 shows that the designated WP block address is out of the valid range, this routine ends as error termination.

Figure 16:
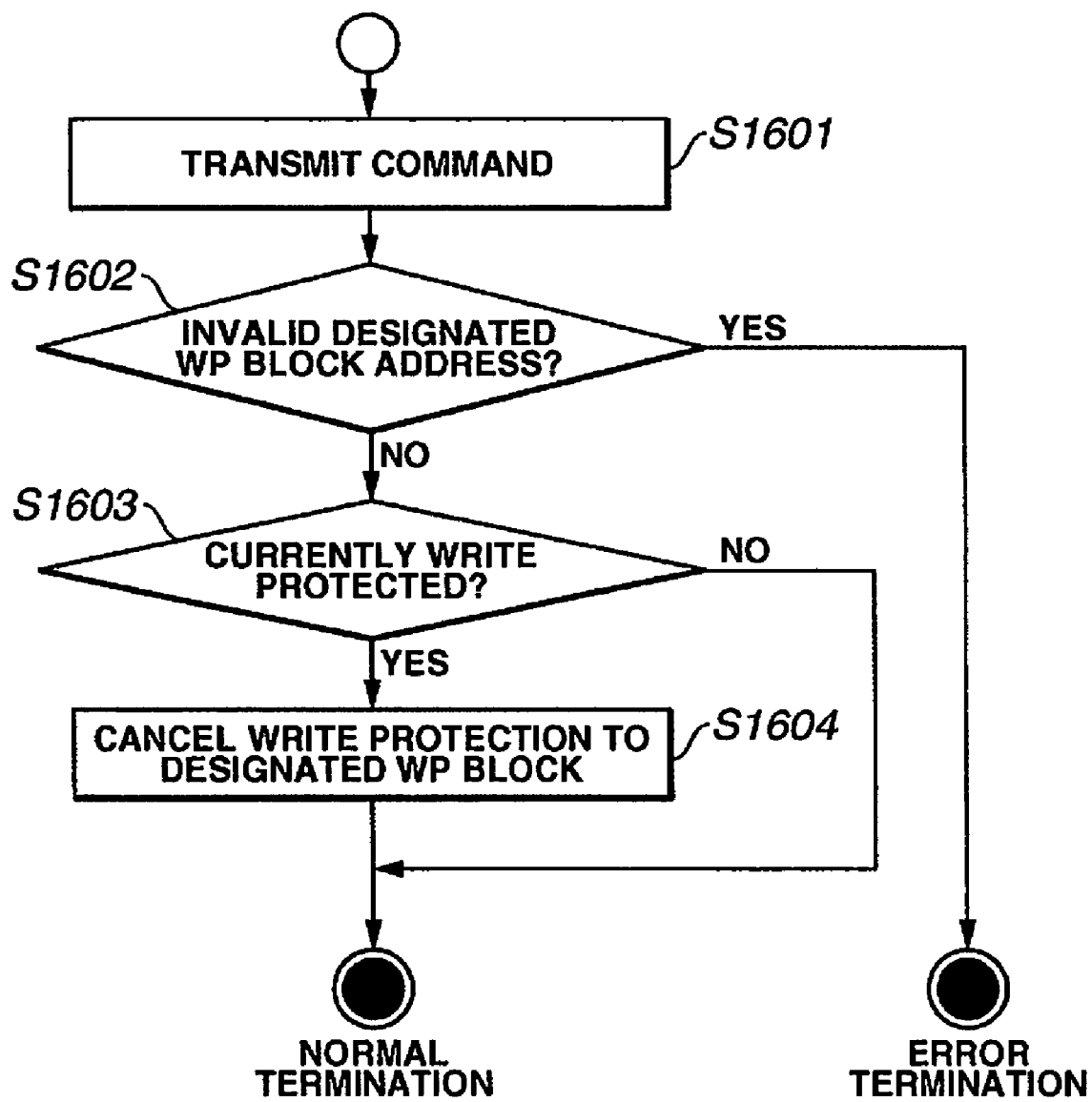
FIG. 16 is a flowchart diagram showing a write protection canceling procedure of the SD memory card.

FIG. 16 is a flowchart showing the above-described canceling write protection operation (B.2). First in step S1601, the SD card driver transmits a write protect cancellation requesting command to the SD memory card 17. This command contains a WP block address of a WP block whose write protection should be canceled. The controller unit 20, upon receipt of this command, makes a determination in step S1602 whether the designated WP block address is in a valid range. When the designated WP block address is in a valid range, a further determination is made in step S1603 whether the WP block of the designated WP block address is currently write protected.

When the WP block is currently write protected, the controller unit 20 proceeds to step S1604 to cancel the write protection applied to the WP block of the designated WP block address. Then, this routine ends as normal termination.

When the determination of step S1603 shows that the WP block of the designated WP block address is not currently write protected, this routine ends as normal termination. When the determination of step S1602 shows that the designated WP block address is out of the valid range, this routine ends as error termination.

Figure 17:
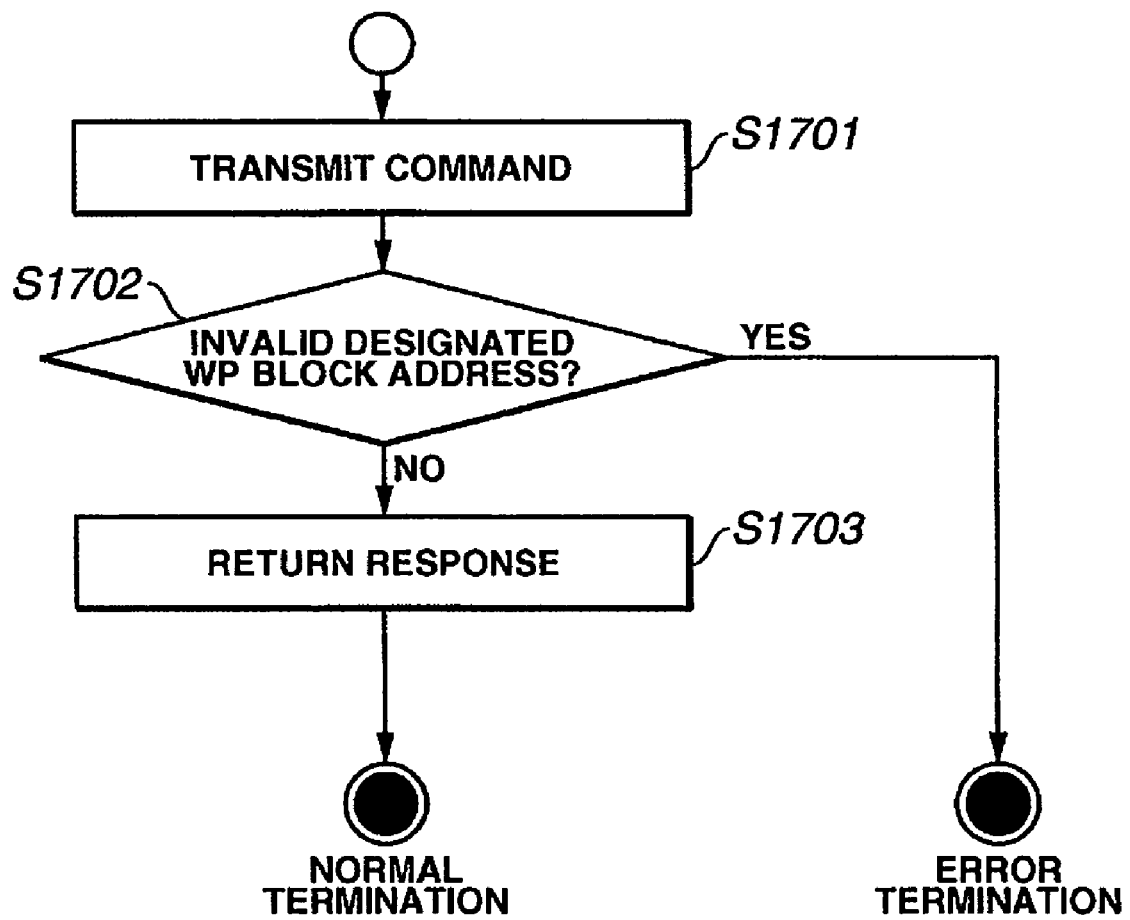
FIG. 17 is a flowchart diagram showing a write protected condition check procedure of the SD memory card.

FIG. 17 is a flowchart showing the above-described checking a write protected condition operation (B.3). First in step S1701, the SD card driver transmits a write protected condition checking request command to the SD memory card 17. This command contains a WP block address of the WP block whose write protected condition should be checked. The controller unit 20, upon receipt of this command, makes a determination in step S1702 whether the designated WP block address is in a valid range. When the designated WP block address is in a valid range, the controller unit 20 proceeds to step S1703 to make a determination whether the WP block of the designated WP block address is currently write protected. This determination result is returned as a response to the SD card driver. Then, regardless of the determination result in step S1703, this routine ends as normal termination. When the determination result of step S1702 shows that the designated WP block address is out of the valid range, this routine ends as error termination.

Figure 18:
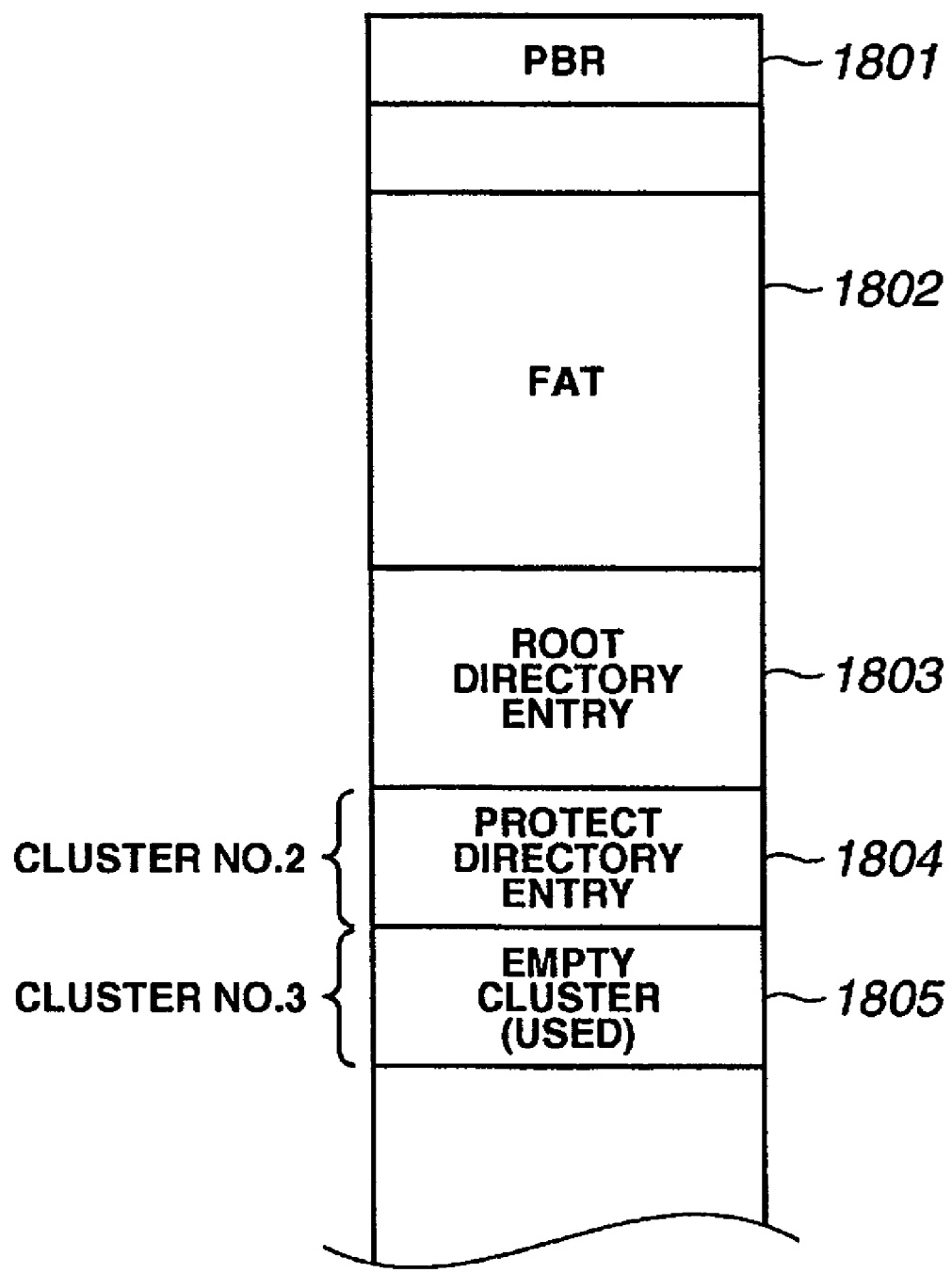
FIG. 18 is a diagram showing an initial data structure in a case where a write protected file writing operation is performed for the SD memory card.

A data structure of the SD memory card 17 according to the first embodiment will be explained below. FIG. 18 shows an initial condition of the SD memory card 17, which includes a PBR 1801, a FAT 1802, a root directory entry 1803, a protect directory entry 1804, and an empty cluster 1805. The protect directory entry 1804, i.e., a directory entry that stores a protect file, is a cluster located immediately after the root directory entry 1803. A cluster number '2' is assigned to this cluster. Write protection is applied to the protect directory entry 1804. Furthermore, the protect directory entry 1804 has no linkage. Therefore, this protect directory stores a limited number of files. A cluster number '3' is assigned to the empty cluster 1805. The empty cluster 1805 is a cluster having been used as a result of modification applied to the FAT. This cluster is utilized to identify a cluster size in a protect file restoring function (described later).

A WP block boundary matching function according to the first exemplary embodiment of the present invention will be explained below. The WP block boundary matching function, in order to realize write protection for each cluster unit, sets a cluster size equivalent to an integral multiple of the WP block size and realizes the capability of matching a cluster boundary with the WP block boundary. When formatting of the SD memory card 17 is performed by the digital camera, the WP block boundary matching function enables this formatting in a condition that the cluster boundary matches with the WP block boundary. It is now supposed that the SD memory card 17 is formatted by the digital camera.

The cluster boundary is defined by a cluster start position and a cluster size. On the other hand, the WP block is a size inherent to the SD memory card 17 and is not variable. Therefore, by adjusting the start position of the cluster and the cluster size with the WP block, the cluster boundary can be matched with the WP block boundary. The cluster start position is immediately after the root directory entry, and is defined according to the formula shown in FIG. 23. In FIG. 23, a partition starting address 2301 is a leading address "0" according to the present embodiment. Reserve sector number 2302, sector size 2303, FAT size 2304, number of FAT 2305, and root directory entry number 2306 are parameters of the BPB 802.

In this case, the parameters are determined so that a value derived by the formula of FIG. 23, i.e., the cluster start position address, can be equal to an integral multiple of the WP block size. Furthermore, as the cluster size is a parameter of the BPB 802, the parameters are determined so that the cluster size can be equal to an integral multiple of the WP block size. The digital camera performs formatting of the SD memory card 17 based on the BPB 802 being thus formed, thereby realizing the formatting under the condition that the cluster boundary is matched with the WP block boundary.

Further explanation will be given below with practical values. When the SD memory card 17 has inherent parameters shown in FIG. 20, the cluster size is set to be 8K bytes, i.e., 4 times the WP block size, so that the cluster boundary is matched with the WP block boundary. Then, the initial condition shown in FIG. 18 is produced.

In this case, to reduce a useless data region, the goal is to produce as many pluralities of clusters as possible. If the entire data region is allocated for clusters, it will be possible to provide a total of 1280 (i.e., 10M÷8K) clusters. However, as the reserve sector number (including a PBR), the FAT size (×2), and the root directory entry size should be located at the head, a maximum number of clusters is obtained by subtracting this margin.

First, the reserve sector number (Y) requires at least one 1 sector as a PBR region. The FAT size should be two times the region capable of storing the FAT entries corresponding to the number of clusters (i.e., number of FAT). As one FAT entry is 16 bits according to the FAT16 file system, one sector can include 256 FAT entries. Although a FAT should have FAT entries equal to or greater than the number of clusters, a smaller number of FAT entries are preferable. Let the sector number required for one FAT be X. The root directory entry size depends on the root directory entry number. The root directory entry number is usually 512. As one directory entry is 32 bytes, the root directory entry size is 16K bytes (i.e., 32 sectors). Furthermore, to match the cluster boundary with the WP block boundary, a sum of the reserve sector number, the FAT, and the root directory entry must be equal to an integral multiple of the WP block size.

The following formulas 1 and 2 are derived from the above conditions.

cluster maximum number=(reserve sector number+
FAT sector number×2+root directory entry size)/
(cluster size/sector size)<FAT entry number per
sector×FAT sector number        (Formula 1)

(reserve sector number+FAT sector number×2+root
directory entry size)=(WP block size/sector size)        (Formula 2)

The following formula 3 is obtained by substituting values into the above formulas 1 and 2.

1280−(Y+2X+32)/16<256X(X and Y are integers)        (Formula 3)

Y+2X+32=4α(X, Y, and α are arbitrary integers)        (Formula 4)

Furthermore, the formula 3 can be converted into the following formula 5.

4098X>20480−Y        (Formula 5)

In the formula 5, as X represents the sector number of FAT, it should take a minimum number. As X is an integer, it is understood that X is 5.

Based on the above, the following equation 6 will be obtained by converting the formula 4.

Y+42=4α        (Formula 6)

In the formula 6, Y is the reserve sector number and should be an integer equal to or greater than 1.

If a minimum value is taken to reduce a useless portion, it will be understood that Y is 2.

Figure 22:
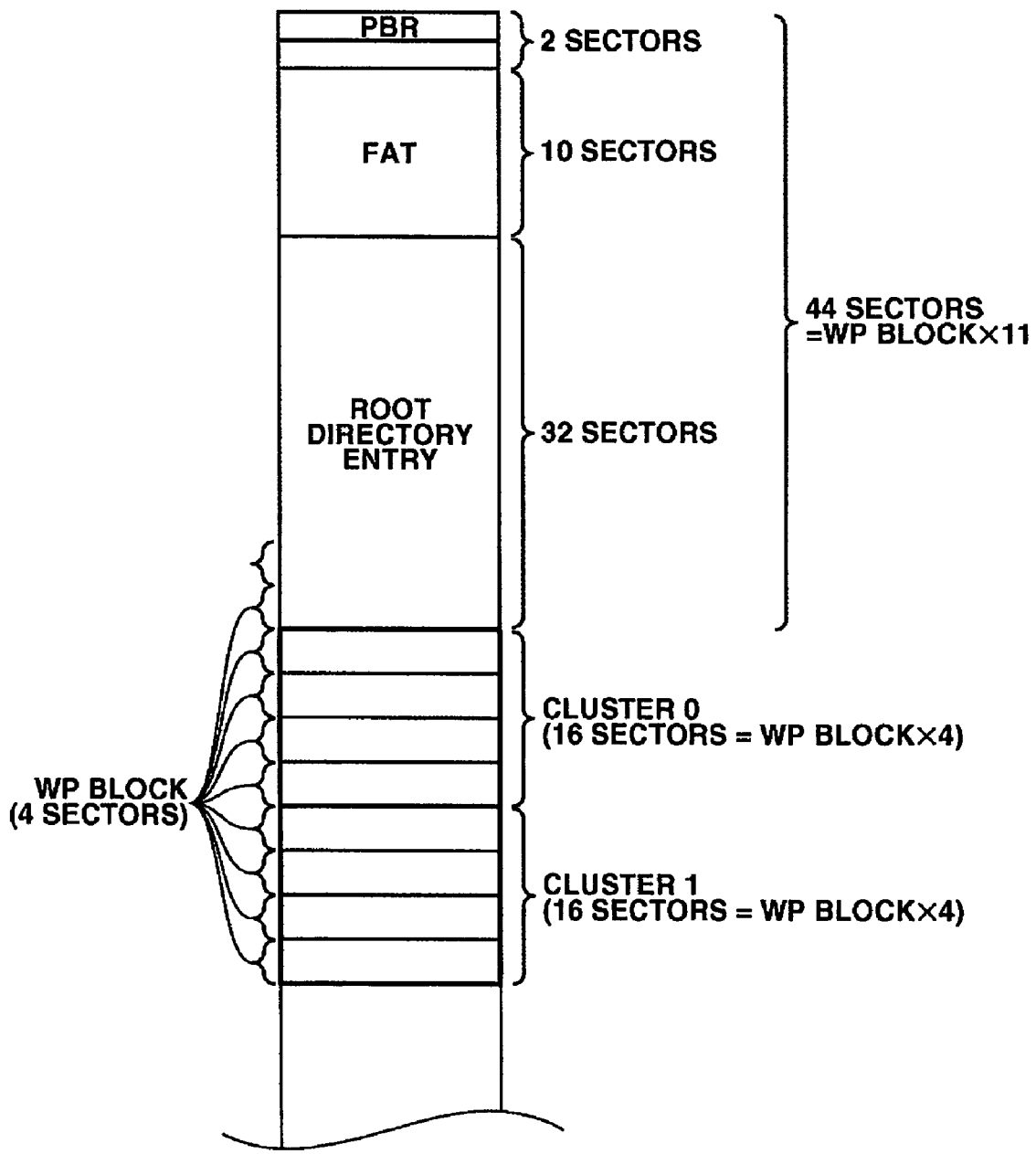
FIG. 22 is a diagram showing a structure of data regions of the SD memory card that is formatted based on the parameters shown in FIG. 21.

Based on the above calculations, if formatting is performed after the BPB parameters are set as shown in FIG. 21, a data structure shown in FIG. 22 is obtained. The cluster boundary can be matched with the WP block boundary. The WP block boundary matching function of the present embodiment enables write protection for each cluster, and, as a result, the write protection for each directory entry and for each file is feasible.

By using the above-described write protect function of the SD memory card 17, a write protected file accessing function according to the first exemplary embodiment of the present invention will be explained below. The write protected file accessing function is realized by a write protected file writing function for writing a write protected file into the SD memory card 17. Furthermore, the write protected file accessing function is realized by a write protected file deleting function for deleting the write protected file and a write protected file rewriting function for rewriting the write protected file.

Figure 3:
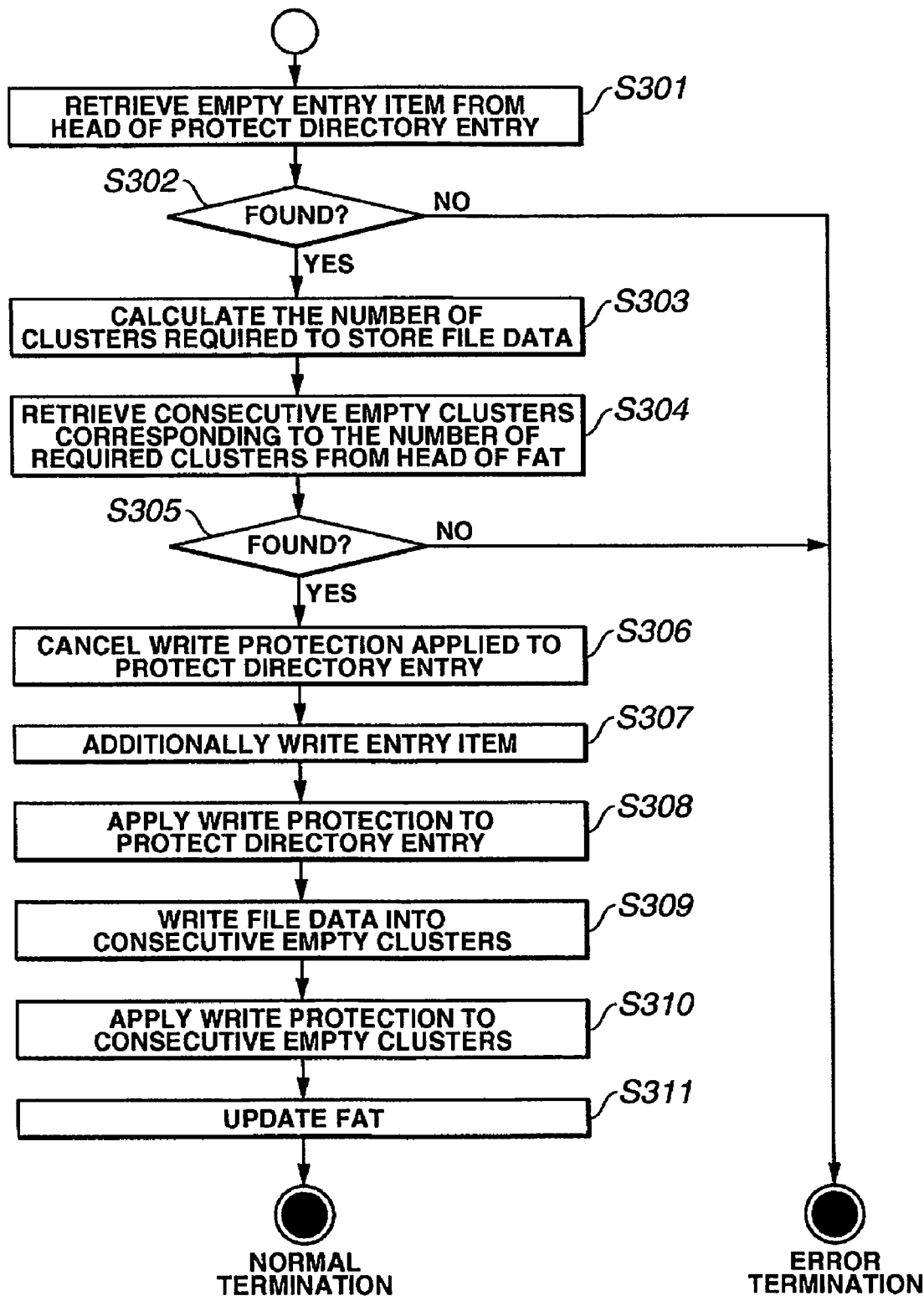
FIG. 3 is a flowchart diagram showing a write protected file writing procedure in accordance with the first embodiment of the present invention.

First, the write protected file writing function will be explained. The write protected file writing function includes applying write protection to a file, if this file is a new writing objective file, and performing a writing operation. FIG. 3 is a flowchart showing the procedure of writing a file into the SD memory card 17 that is realized by the write protected file writing function of the present embodiment. The file system software processes all of read/write instructions by utilizing the above-described services (A.1) and (A.2). Furthermore, the file system software processes the write protection/cancellation instructions and the write protected condition check instruction by utilizing the above-described services (B.1) to (B.3). In this case, it is supposed that the write protection/cancellation and the write protected condition check for a cluster (including a directory entry) includes executing the services (B.1) to (B.3) with respect to all of the WP blocks constituting the cluster.

The flowchart of FIG. 3 will be explained below. First, step S301 executes the processing of successively reading the protect directory entry from the head thereof to retrieve an empty entry item. Then, in step S302, a determination is made whether any empty entry item has been found. When any empty entry item has been found, step S303 executes the processing of calculating the number of clusters required to store file data. Then, step S304 executes the processing of reading the FAT to retrieve consecutive empty clusters corresponding to the number of required clusters. Then, in step S305, a determination is made whether such consecutive empty clusters have been found. When the consecutive empty clusters have been found, step S306 executes the processing of canceling the write protection applied to the protect directory entry.

Then, step S307 executes the processing of storing, into an empty entry item position retrieved in step S301, an entry item having link information relating to the leading cluster of the consecutive empty clusters. Next, step S308 executes the processing of again applying write protection to the protect directory entry. Step S309 then executes the processing of writing the file data into the consecutive empty clusters. Step S310 executes the processing of applying write protection to the consecutive empty clusters. Step S311 executes the processing of updating the FAT. Then, this routine ends as normal termination. When no empty entry item has been found in step S302, or when no consecutive empty clusters have been found in step S305, this routine ends as error termination.

Both the write protected file deleting function and the write protected file rewriting function will be explained below. The write protected filed deleting function is a function for deleting file data written by the write protected file writing function. The write protected file rewriting function is a function for rewriting file data written by the write protected file writing function and again applying write protection to the rewritten file. Both the write protected file deleting function and the write protected file rewriting function commonly include, as an initial step, execution of a write protection canceling operation for canceling the write protection applied to the currently written file data. After finishing the write protection canceling operation, the write protected file deleting function includes deletion of the file data. The write protected file rewriting function includes execution of writing by the write protected file writing function before completing the operation.

Figure 24:
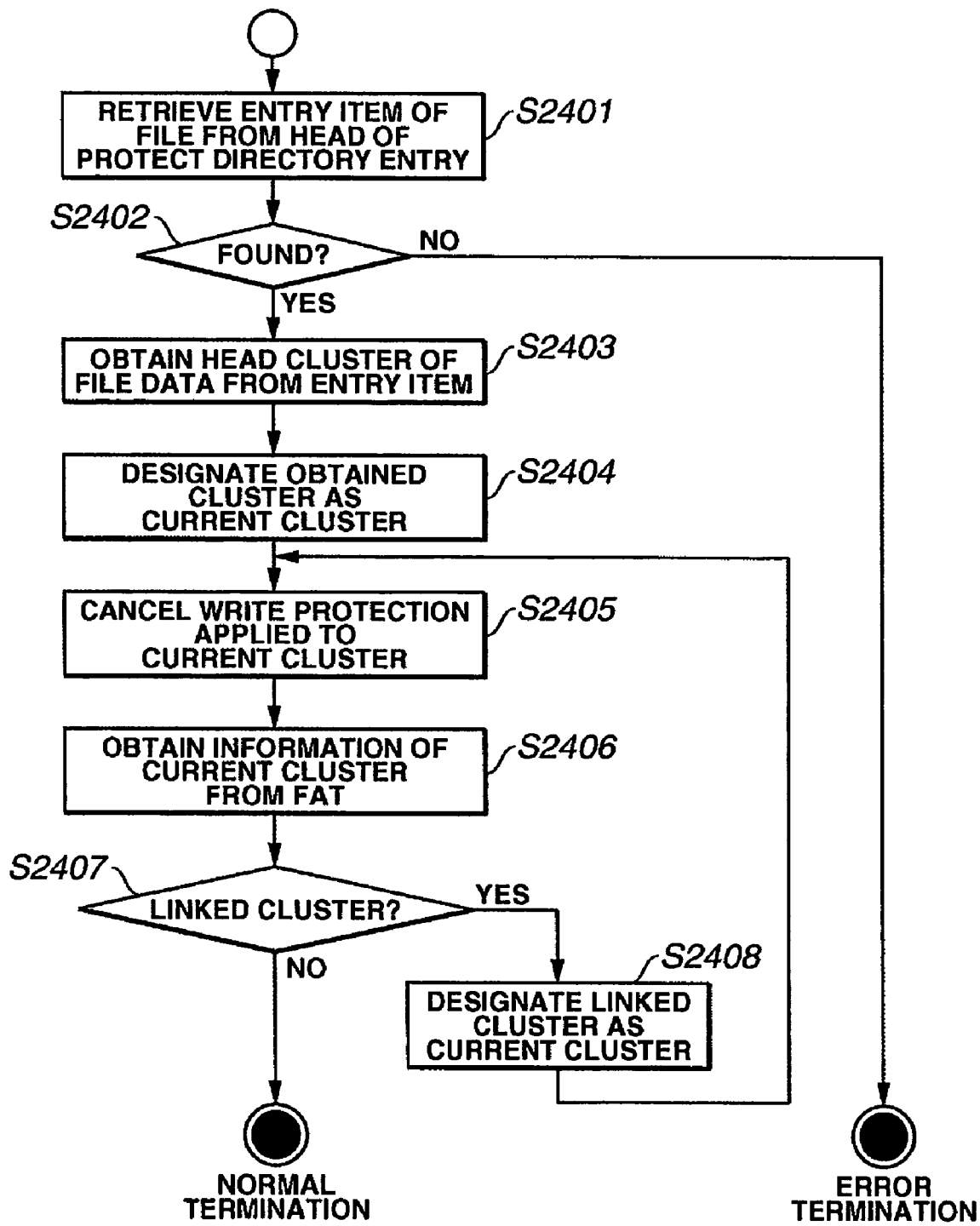
FIG. 24 is a flowchart diagram showing a write protection canceling procedure performed for realizing a write protected file deleting function and a write protected file rewriting function.

The write protection canceling operation will be explained below. FIG. 24 is a flowchart showing the procedure for canceling write protection applied to the file being write protected that exists in the SD memory card 17. The file system software processes all of read/write instructions by utilizing the services (A.1) and (A.2). Furthermore, the file system software processes the write protection/cancellation instruction and the write protected condition check instruction by utilizing the services (B.1) to (B.3). In this case, it is supposed that the write protection/cancellation and the write protected condition check for a cluster (including a directory entry) includes executing the services (B.1) to (B.3) with respect to all of the WP blocks constituting the cluster.

The flowchart of FIG. 24 will be explained below. First, step S2401 executes the processing of successively reading the protect directory entry from the head thereof to retrieve an entry item of an objective file to be rewritten and deleted. Then, in step S2402, a determination is made whether the entry item has been found. When the entry item has been found, step S2403 executes the processing of obtaining, from the entry item, a leading cluster that stores the objective file data to be rewritten and deleted. Then, step S2404 executes the processing of designating the obtained cluster as a current cluster. Step S2405 executes the processing of canceling write protection applied to the current cluster.

Step S2406 then executes the processing of obtaining link information relating to the current cluster from the FAT. Then, in step S2407, a determination is made based on the link information whether the current cluster is linked. When any linkage has been found, step S2408 executes the processing of designating a linked cluster as a new current cluster before returning to the step S2405 to repeat the above processing. When no linkage has been found in step S2407, this routine ends as normal termination. When no entry item has been found in step S2402, this routine ends as error termination.

A write protected file restoring function in accordance with the first exemplary embodiment of the present invention will be explained below. The write protected file restoring function is utilized when a file format of the SD memory card 17 is broken, for example, as a result of formatting. More specifically, this function is a function for restoring a file being written by the write protected file writing function in response to a user or system instruction. The file format maybe broken in the following manner. For example, when the SD memory card 17 is formatted by another host (e.g., a PC or the like), the BPB parameters and the FAT will be rewritten and, as a result, it becomes impossible to identify the position of a file stored before the formatting.

The write protected file restoration includes an information acquiring step and a file data acquiring step. The information acquiring step is a step to obtain the information required to identify the position of the file data being written by the write protected file writing function. Furthermore, the file data acquiring step is a step to obtain the file data based on the file position information obtained by the information acquiring step.

First, the information acquiring step of the present embodiment will be explained. According to the present embodiment, by the write protected file writing function, the file is written into consecutive clusters. Therefore, to identify the position of the file, it is necessary to identify the start position and the size of the clusters as well as the start cluster and the size of the file. According to the present embodiment, as shown in FIG. 18, the protect directory entry is constructed from one cluster, and the protect directory entry is located, in an initial state, at the position indicated by the cluster number '2'. Furthermore, a cluster located immediately after the protect directory entry is set in a used condition in an initial state, and the write protection is not applied to this cluster.

Furthermore, there is no protected region before the protect directory entry. Therefore, when a protected WP block is retrieved from the leading side of the data region, a first found WP block is the head of the protect directory entry. When a consecutively protected region starting from this WP block is retrieved, a finally found WP block is the end of the protect directory entry. With this retrieval, both the cluster size and the cluster start position can be identified. Furthermore, as the protect directory entry stores an entry item of the protected file, both the start cluster and the size of the file data can also be identified.

The file data acquiring step of the present embodiment will be explained below. According to the present embodiment, by the write protected file writing function, the file is written into consecutive clusters. Therefore, the file data can be obtained based on the start position and the size of the clusters as well as the start cluster and the size of the file that are obtained in the information acquiring step.

Figure 4:
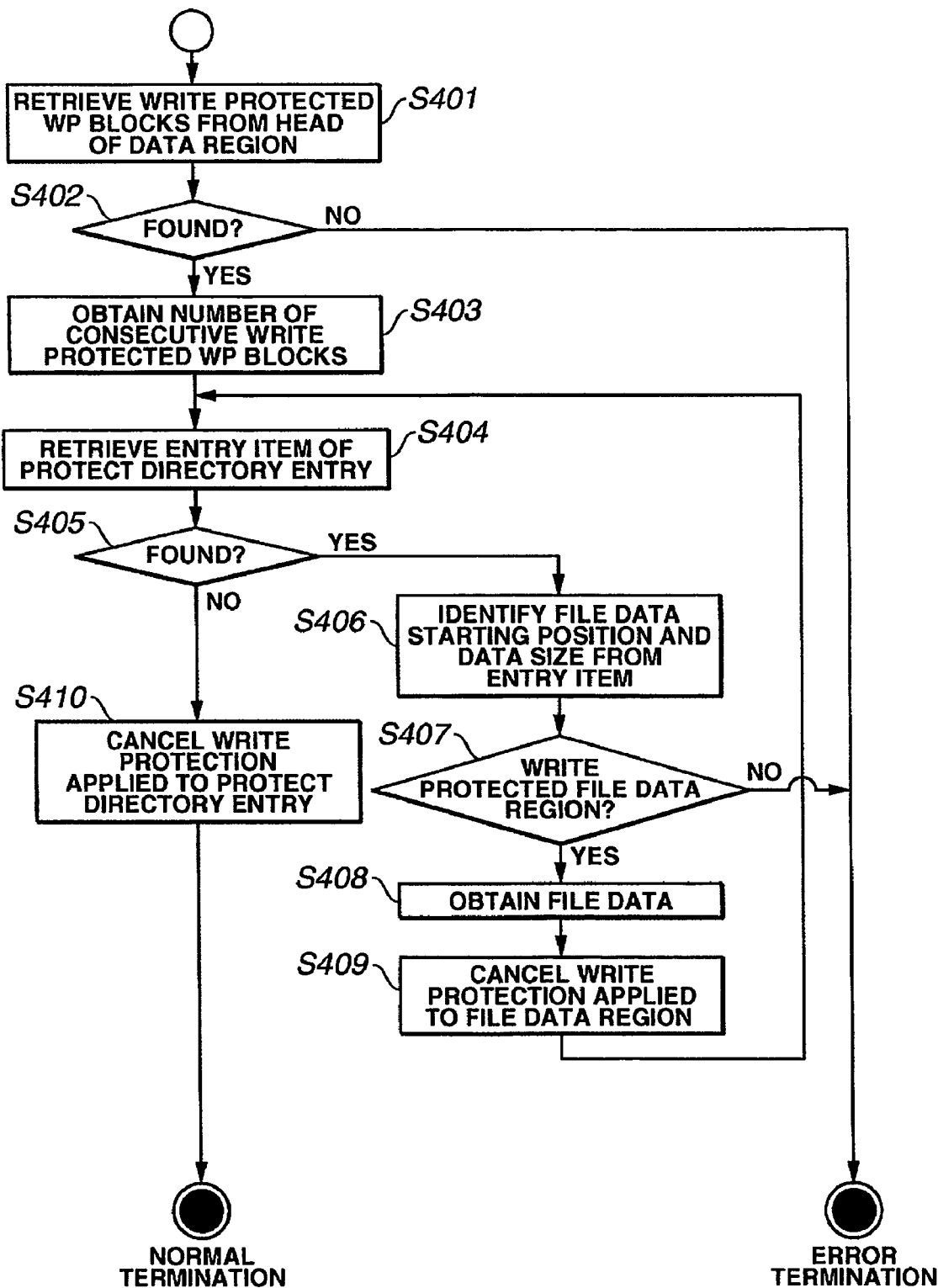
FIG. 4 is a flowchart diagram showing a write protected file restoring procedure in accordance with the first embodiment of the present invention.

FIG. 4 is a flowchart showing the write protected file restoring function of the present embodiment. The flowchart of FIG. 4 will be explained below. First, step S401 executes the processing of successively retrieving write protected WP blocks from the head of a data region of the SD memory card 17. Then, in step S402, a determination is made whether any write protected WP block has been found. When the write protected WP block has been found, step S403 executes the processing of checking how many consecutive WP blocks are write protected. Through this check, the protect directory entry can be confirmed together with the cluster size obtained prior to breakage of the file format.

Next, step S404 executes the processing of retrieving an entry item of the protect directory entry. Then, in step S405, a determination is made whether the entry item of the protect directory entry has been found. When the entry item of the protect directory entry has been found, step S406 executes the processing of obtaining, from the entry item, both the start cluster number and the size of a file indicated by the entry item. Furthermore, a file data starting address is identified based on the cluster (cluster number '2') of the protect directory entry.

Next, in step S407, a determination is made whether a data region corresponding to the file size is write protected from the file data starting address. If the data region is write protected, step S408 executes the processing of reading the file data and stores the readout file data into another storage medium. Step S409 then executes the processing of canceling the write protection applied to the data region. Then, the file system software returns to the step S404. If no entry item of the protect directory entry has been found in step S405, step S410 executes the processing of canceling the write protection. applied to the protect directory entry. Then, this routine ends as normal termination. If no write protected WP block has been found in step S402, or when the data region is not write protected in step S407, this routine ends as error termination.

Second Exemplary Embodiment

A second exemplary embodiment of the present invention will be explained below. The second embodiment will be explained with reference to the SD memory card 17 that is detachable from the digital camera described in the first embodiment. It is supposed that the block device of the SD memory card 17 can provide the above-described services (A.1) and (A.2). The data region of the SD memory card 17 has no MBR 501. The whole data region constitutes one partition as a whole. This partition is formatted and managed by the FAT16 file system. Furthermore, a WP block boundary matching function of the second exemplary embodiment of the present invention is substantially the same as the WP block boundary matching function of the first exemplary embodiment.

A data structure of the SD memory card 17 according to the second exemplary embodiment will be explained below. The data structure of the SD memory card 17 according to the second exemplary embodiment does not use a special format, but uses a format conforming to the FAT file system as shown in FIG. 7. Therefore, a special directory that stores a protected file, such as the protect directory in the first exemplary embodiment, is not present. According to the second exemplary embodiment, any directory can store a protected file. Furthermore, as no special formatting is employed, there is no restriction with respect to the initial condition unlike the first exemplary embodiment. Therefore, even if the SD memory card 17 has a file already written therein, the second exemplary embodiment can be applied as long as the SD memory card 17 is formatted in accordance with the FAT file system.

A write protected file accessing function of the second exemplary embodiment of the present invention will be explained below. The write protected file accessing function is realized by a write protected file writing function that executes writing of a write protected file. Furthermore, the write protected file accessing function is realized by a write protected file deleting function for deleting the write protected file and a write protected file rewriting function for rewriting the write protected file.

First, the write protected file writing function will be explained. The write protected file writing function is a function for applying write protection to a file, if this file is a new writing objective file, and performing a writing operation. The write protected file writing function includes execution of writing file data into consecutive clusters and applying write protection to the clusters. However, among the consecutive clusters storing the file data, only a final cluster is differently processed so that write protection is applied to only a WP block (or WP blocks) storing the file data, not applied to the entire final cluster. In a case where the file data occupies all of the WP blocks constituting the final cluster, a cluster succeeding the final cluster is reserved as a used region.

Figure 27:
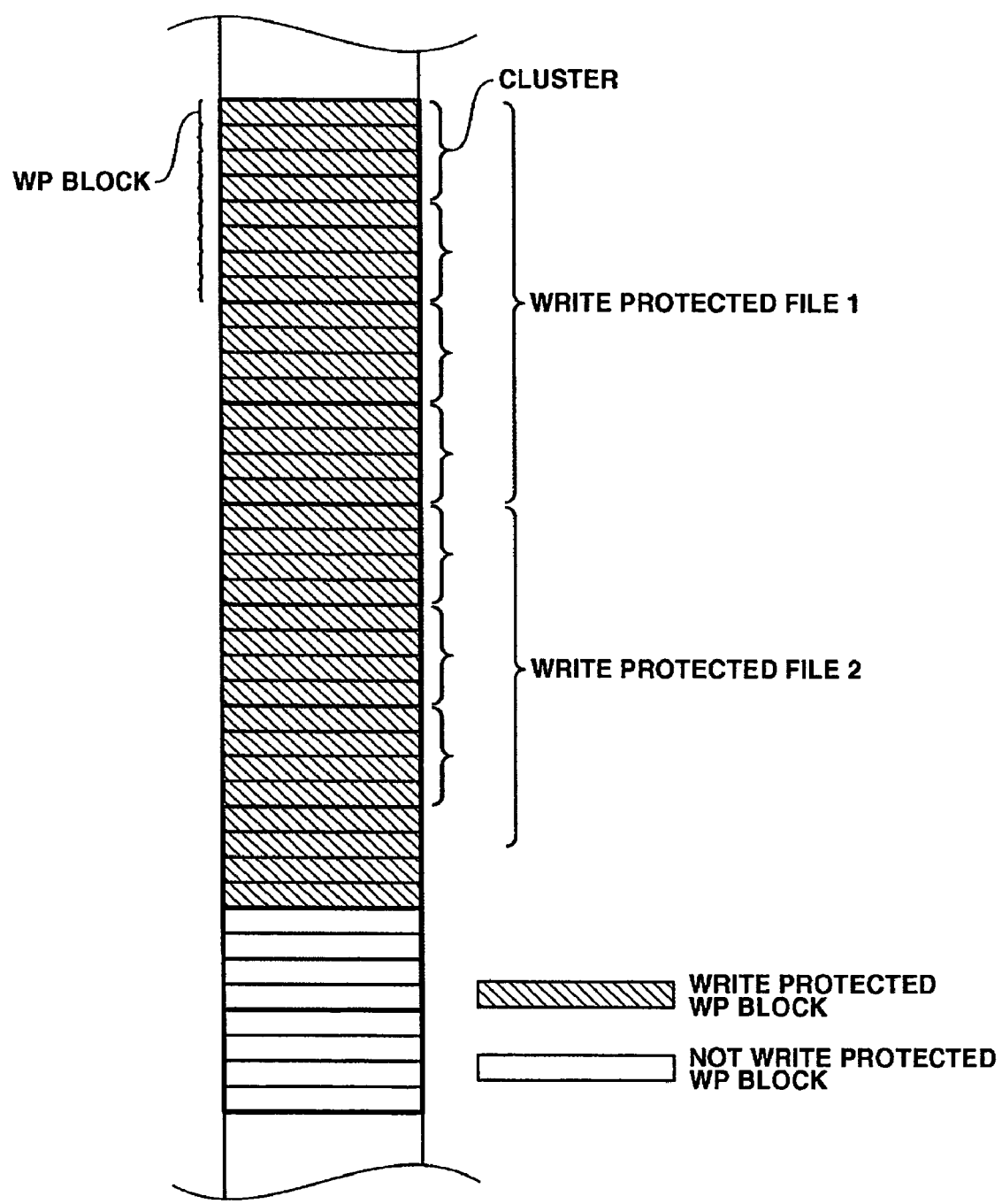
FIG. 27 is a diagram showing a first structure of data regions in the SD memory card that is write protected.
Figure 28:
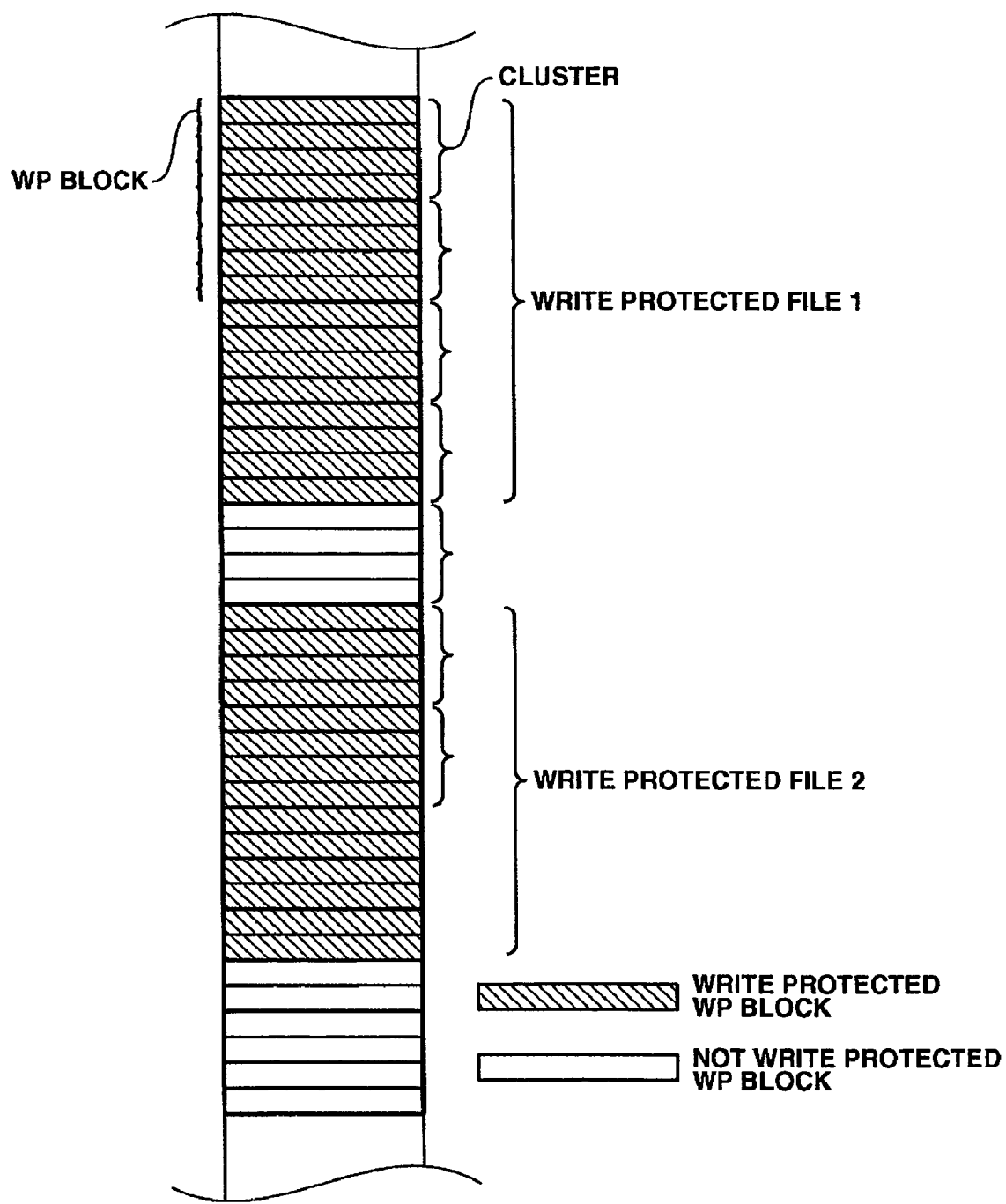
FIG. 28 is a diagram showing a second structure of data regions in the SD memory card that is write protected.

Accordingly, the file being written by the write protected file writing function is stored in consecutive WP blocks and it is assured that a WP block being not subjected to the write protection is immediately present after the final WP block of the WP blocks storing the file data. This is to identify the file size in a write protected file restoring function (to be described later) according to the second exemplary embodiment. In a case where two files are written by the write protected file writing function and file data of these files are consecutive, a write protected condition as shown in FIG. 27 occurs if write protection is applied to all of the clusters that store the file data. Namely, a write protected file 1 and a write protected file 2 are stored in consecutive write protected regions and, accordingly, it is difficult to identify the boundary between these files. Thus, by applying no write protection to a WP block (or WP blocks) succeeding immediately after the final WP block, as shown in FIG. 28, it becomes possible to identify the size of the write protected file 1 and the size of the write protected file 2.

Figure 25:
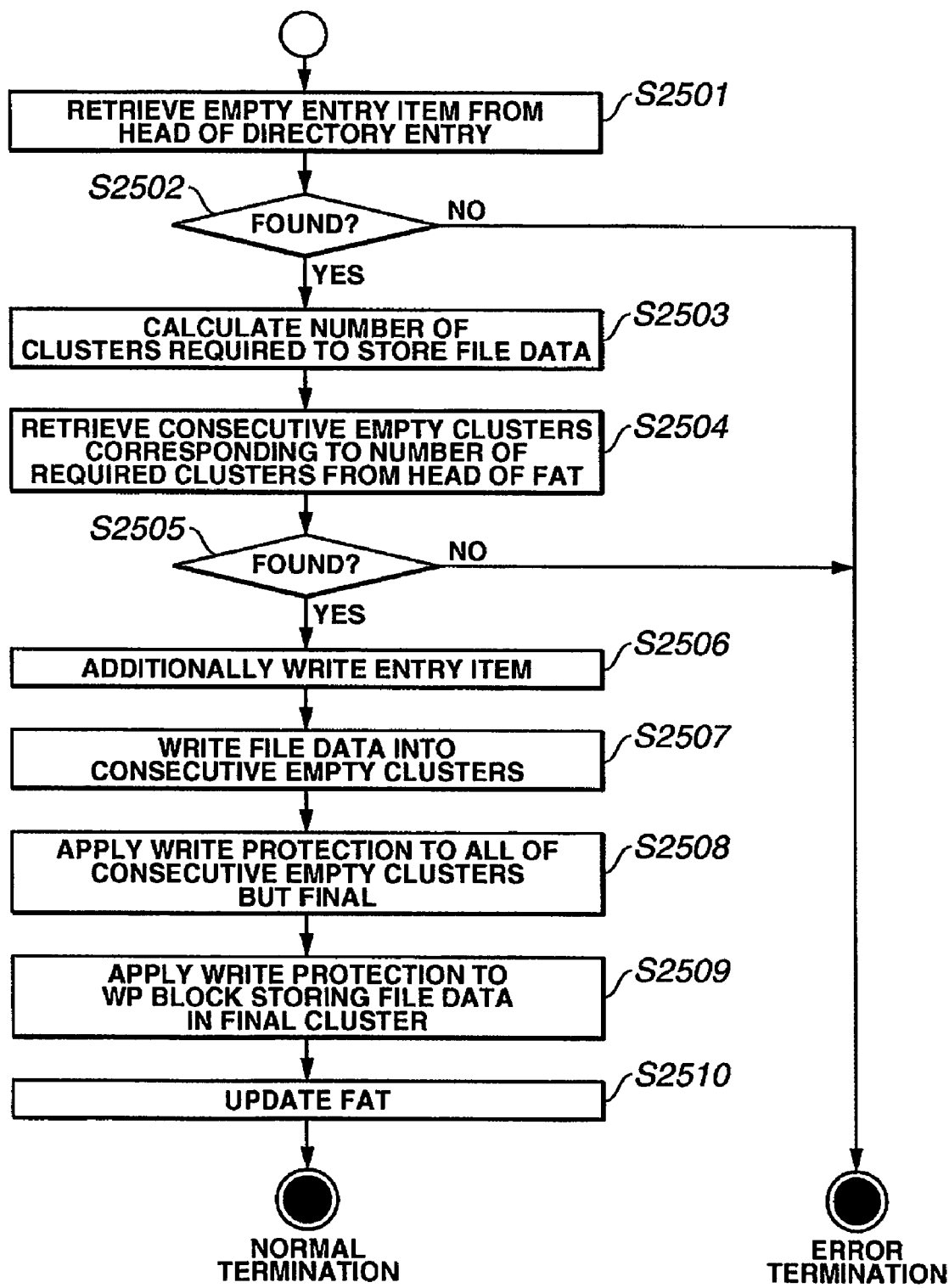
FIG. 25 is a flowchart diagram showing a write protected file writing procedure in accordance with a second embodiment of the present invention.

FIG. 25 is a flowchart showing the procedure of writing a file into the SD memory card 17 that is realized by the write protected file writing function of the second exemplary embodiment. The file system software processes all of read/write instructions by utilizing the above-described services (A.1) and (A.2). Furthermore, the file system software processes the write protection/cancellation instruction and the write protected condition check instruction by utilizing the above-described services (B.1) to (B.3). In this case, it is supposed that the write protection/cancellation and the write protected condition check for a cluster (including a directory entry) includes executing the services (B.1) to (B.3) with respect to all of the WP blocks constituting the cluster.

The flowchart of FIG. 25 will be explained below. First, step S2501 executes the processing of successively reading a directory entry of the directory to be written from the head to retrieve an empty entry item. Then, in step S2502, a determination is made whether any empty entry item has been found. When any empty entry item has been found, step S2503 executes the processing of calculating the number of clusters required to store file data. In this case, if the file data extends to the final WP block of WP blocks constituting the final cluster, a value obtained by adding 1 to a required number of clusters is set as the number of required clusters.

Next, step S2504 executes the processing of reading the FAT to retrieve consecutive empty clusters corresponding to the number of required clusters calculated in step S2503. Then, in step S2505, a determination is made whether such consecutive empty clusters have been found. When the consecutive empty clusters have been found, step S2506 executes the processing of storing, into an empty entry item position retrieved in step S2501, an entry item having link information relating to the leading cluster of the consecutive empty clusters.

Step S2507 executes the processing of writing the file data into the consecutive empty clusters. Then, step S2508 executes the processing of applying write protection to all of the consecutive empty clusters but the final cluster. Next, step S2509 executes the processing of applying write protection to a WP block (or WP blocks) storing the file data among the WP blocks constituting the final cluster. In this case, the processing of step S2509 is omitted when there is no WP block storing the file data in the final cluster. Finally, step S2510 executes the processing of updating the FAT. Then, this routine ends as normal termination. When no empty entry item has been found in step S2502, or when the consecutive empty clusters have not been found in step S2505, this routine ends as error termination.

The write protected file deleting function and the write protected file rewriting function will be explained below. The write protected file deleting function and the write protected file rewriting function according to the second exemplary embodiment are substantially the same as those of the first exemplary embodiment. However, in step S2405 of FIG. 24 showing the write protection canceling operation, some of the WP blocks constituting the current cluster may not be subjected to write protection when the current cluster is the final cluster of the consecutive clusters. In this case, write protect cancellation is performed for the write protected WP blocks only.

The write protected file restoring function of the second exemplary embodiment of the present invention will be explained below. The write protected file restoring function is utilized when a file format of the SD memory card 17 is broken, for example, as a result of formatting. More specifically, this function is a function for restoring a file being written by the write protected file writing function in response to a user or system instruction. The file format may be broken in the following manner. For example, when the SD memory card 17 is formatted by another host (e.g., a PC or the like), the BPB parameters and the FAT will be rewritten and, as a result, it becomes impossible to identify the position of a file stored before the formatting.

The write protected file restoring function includes an information acquiring step and a file data acquiring step. The information acquiring step is a step to obtain the information required to identify the position of the file data written by the write protected file writing function. Furthermore, the file data acquiring step is a step to obtain the file data based on the file position information obtained by the information acquiring step.

First, the information acquiring step of the second exemplary embodiment will be explained. According to the second exemplary embodiment, a file written by the write protected file writing function is stored in consecutive WP blocks and it is assured that a WP block being not subjected to the write protection is present immediately after the final WP block of the WP blocks storing the file data. Therefore, the position of the file can be identified by retrieving a write protected WP block and identifying the number of consecutive write protected WP blocks beginning with the retrieved WP block, thereby identifying the start position and the size of the file.

The file data acquiring step of the second exemplary embodiment will be explained below. The file data can be obtained based on the start position and the size of the file data obtained in the information acquiring step.

Figure 26:
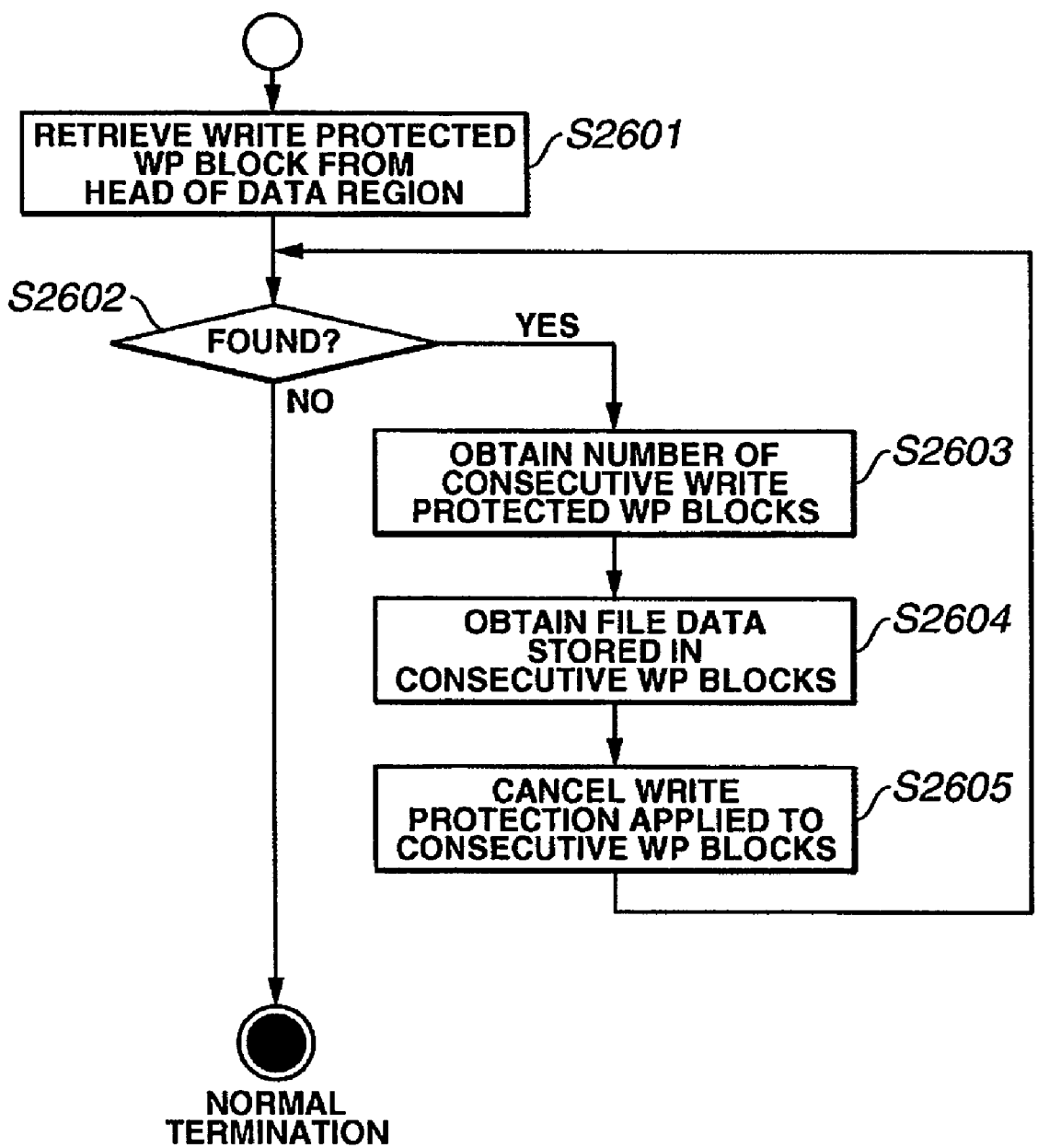
FIG. 26 is a flowchart diagram showing a write protected file restoring procedure in accordance with the second embodiment.

FIG. 26 is a flowchart showing a write protected file restoring procedure according to the second exemplary embodiment. The flowchart of FIG. 26 will be explained below. First, the file system software starts with step S2601 that executes the processing of successively retrieving a write protected WP block from the head of the data region of the SD memory card 17. Then, in step S2602, a determination is made whether any write protected WP block has been found. When the write protected WP block has been found, step S2603 executes the processing of checking how many WP blocks are consecutively write protected. Through this processing, the start position and the size of the write protected file can be confirmed.

Next, step S2604 executes the processing of obtaining file data stored in the consecutive WP blocks obtained in step S2603. Then, step S2605 executes the processing of canceling the write protection applied to the consecutive WP blocks. Then, the file system software returns to step S2602 to repeat the above-described processing. When no write protected WP block has been found in step S2602, this routine ends as normal termination.

According to the above-described embodiments, write protection is applied to file data by the WP block boundary matching function, the write protected file writing function, and the write protected file restoring function. In this case, applying the write protection only to the clusters storing the file facilitates efficient write protection applied to the file data. Furthermore, regardless of the type of software or device used for data management, the write protected file is not deleted. Furthermore, even if breakage of the file system occurs due to formatting or the like, the write protected file can be restored.

Other Embodiments

The above-described embodiments have been described with reference to a storage medium that is formatted so as not to have the MBR 501. However, the present invention can also be applied to other storage media that have the MBR 501 and a plurality of partitions if they have the capability of obtaining the starting address of the partition.

Furthermore, although the above-described embodiments have been described based on an SD memory card 17 as an example of a storage medium, any storage medium that would enable practice of the present invention is applicable.

Furthermore, according to the above-described embodiments, the write protected file writing function and the write protected file restoring function are explained based on the condition that the cluster boundary and the WP block boundary are matched by the WP block boundary matching function. However, even in a case where the cluster boundary is not matched with the WP block boundary, the present invention can also be applied to a storage medium having a function of applying write protection to all of the WP blocks that store at least part of the protected file data and having a function of preventing a cluster including at least part of the write protected WP blocks from being written with another data.

Furthermore, the above-described embodiments have been explained based on the condition that the write protected file is written into consecutive cluster regions. However, the present invention is applicable when all FAT regions are write protected and the link information is also protected even if a file is written into non-consecutive cluster regions.

Furthermore, according to the above-described embodiments, the write protect directory is located, in an initial condition, immediately after the root directory entry. Furthermore, a used empty cluster is present immediately after the write protect directory. When the write protected file is written, it is written into the write protect directory. However, the present invention is applicable even when all of the directory entries into which the write protected file is written are write protected and formatted. In this case, it is necessary to have a function of identifying the cluster size and the cluster start position.

Furthermore, although the above-described embodiments have been explained based on the FAT file system, the present invention is not limited to this configuration. Even if the data region of a storage medium is managed by any other file system, the WP block boundary matching function of the present invention is usable as long as clusters or other minimum units are present.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-334805 filed Nov. 18, 2004, which is hereby incorporated by reference herein in its entirety.

What is claimed is:

1. A storage managing system for managing data storage of a storage medium, comprising:
   a write protecting unit configured to apply write protection to data in units of a block having a predetermined size;
   a block boundary matching unit configured to match a boundary of a cluster, which is a minimum data unit in a data region of the storage medium, with a boundary of at least one or more consecutive blocks; and
   a write protect canceling unit configured to cancel write protection applied to a block write protected by the write protecting unit.

2. The storage managing system according to claim 1, wherein said block boundary matching unit matches the boundary between a management information region of the storage medium and the cluster with a boundary of at least one or more consecutive blocks.

3. The storage managing system according to claim 2, wherein the management region is a root directory entry region of the storage medium.

4. A storage managing system for managing data storage of a storage medium, comprising:
   a write protecting unit configured to apply write protection to data in units of a block having a predetermined size;
   a block boundary matching unit configured to match a boundary of a cluster, which is a minimum data unit in a data region of the storage medium, with a boundary of at least one or more consecutive blocks;
   a write protect writing unit configured to cause the write protecting unit, after writing of data, to apply write protection to all of the at least one or more consecutive blocks in which data is stored at the time of writing of data;
   a consecutive region storing unit configured to store written data into consecutive regions at the time of writing of data; and
   a consecutive region write protect writing unit configured to cause the write protect writing unit, after writing of data, to apply write protection to all of the at least one or more consecutive blocks in which data is stored, when the data is written by the consecutive region storing unit.

5. The storage managing system according to claim 4, further comprising:
   a data leading address identifying unit configured, when data of a region other than a write protected block is rewritten and deleted in excess of a predetermined amount, to identify an address of a head of data written by the consecutive region write protect writing unit before the rewriting and deletion is executed;
   a data size identifying unit configured, when data of a region other than a write protected block is rewritten and deleted in excess of a predetermined amount, to identify a size of data written by the consecutive region write protect writing unit before the rewriting and deletion is executed; and
   a data restoring unit configured to obtain data corresponding to the size identified by the data size identifying unit from the address identified by the data leading address identifying unit.

6. A storage managing system for managing data storage of a storage medium, comprising:
   a write protecting unit configured to apply write protection to data in units of a block having a predetermined size;
   a block boundary matching unit configured to match a boundary of a cluster, which is a minimum data unit in a data region of the storage medium, with a boundary of at least one or more consecutive blocks;
   a cluster address allocating unit configured to allocate a unique address to the cluster when the boundary of the cluster is matched with the boundary of the at least one or more consecutive blocks by the block boundary matching unit; and
   a cluster write protecting unit configured to cause the write protecting unit to apply write protection to all of the blocks constituting a cluster having a predetermined address in the cluster address allocated by the cluster address allocating unit.

7. The storage managing system according to claim 6, further comprising a cluster write protect writing unit configured to cause the cluster write protecting unit, after writing of data, to apply write protection to at least one cluster in which data is stored at the time of writing of data.

8. The storage managing system according to claim 7, further comprising:
   a consecutive cluster storing unit configured to store written data into consecutive clusters at the time of writing of data; and
   a consecutive cluster write protect writing unit configured to cause the cluster write protect writing unit, after writing of data, to apply write protection to all of at least one or more consecutive clusters in which data is stored, when the data is written by the consecutive cluster storing unit.

9. The storage managing system according to claim 6, wherein said block boundary matching unit matches the boundary between a management information region of the storage medium and the cluster with a boundary of at least one or more consecutive blocks.

10. The storage managing system according to claim 9, wherein the management region is a root directory entry region of the storage medium.

11. A storage managing method for managing data storage of a storage medium, comprising:
    a block boundary matching step of matching a boundary of a cluster, which is a minimum data unit in a data region of the storage medium, with a boundary of at least one or more consecutive blocks each having a predetermined size;
    a write protecting step of applying write protection to data in units of the block; and
    a write protect canceling step of canceling write protection applied to a block write protected by the write protecting step.

12. Computer-executable process steps for causing a computer to execute the method of claim 11.

13. A computer-readable storage medium for storing the computer-executable process steps of claim 12.

14. The storage managing method according to claim 11, wherein said block boundary matching step matches the boundary between a management information region of the storage medium and the cluster with a boundary of at least one or more consecutive blocks.

15. The storage managing method according to claim 14, wherein the management region is a root directory entry region of the storage medium.

16. A storage managing method for managing data storage of a storage medium, comprising:
    a block boundary matching step of matching a boundary of a cluster, which is a minimum data unit in a data region of the storage medium, with a boundary of at least one or more consecutive blocks each having a predetermined size;
    a write protecting step of applying write protection to data in units of the block; and a write protect writing step of causing the write protecting step, after writing of data, to apply write protection to all of the at least one or more consecutive blocks in which data is stored at the time of writing of data.

17. The storage managing method according to claim 16, further comprising:
   a consecutive region storing step of storing written data into consecutive regions at the time of writing of data; and
   a consecutive region write protect writing step of causing the write protect writing step, after writing of data, to apply write protection to all of the at least one or more consecutive blocks in which data is stored, when the data is written by the consecutive region storing step.

18. The storage managing method according to claim 17, further comprising:
   a data leading address identifying step of, when data of a region other than a write protected block is rewritten and deleted in excess of a predetermined amount, identifying an address of a head of data written by the consecutive region write protect writing step before the rewriting and deletion is executed;
   a data size identifying step of, when data of a region other than a write protected block is rewritten and deleted in excess of a predetermined amount, identifying a size of data written by the consecutive region write protect writing step before the rewriting and deletion is executed; and
   a data restoring step of obtaining data corresponding to the size identified by the data size identifying step from the address identified by the data leading address identifying step.

19. The storage managing method according to claim 16, wherein said block boundary matching step matches the boundary between a management information region of the storage medium and the cluster with a boundary of at least one or more consecutive blocks.

20. The storage managing method according to claim 19, wherein the management region is a root directory entry region of the storage medium.

21. A storage managing method for managing data storage of a storage medium, comprising:
   a block boundary matching step of matching a boundary of a cluster, which is a minimum data unit in a data region of the storage medium, with a boundary of at least one or more consecutive blocks each having a predetermined size;
   a write protecting step of applying write protection to data in units of the block;
   a cluster address allocating step of allocating a unique address to the cluster when the boundary of the cluster is matched with the boundary of the at least one or more consecutive blocks by the block boundary matching step; and
   a cluster write protecting step of causing the write protecting step to apply write protection to all of the blocks constituting a cluster having a predetermined address in the cluster address allocated by the cluster address allocating step.

22. The storage managing method according to claim 21, further comprising a cluster write protect writing step of causing the cluster write protecting step, after writing of data, to apply write protection to at least one cluster in which data is stored at the time of writing of data.

23. The storage managing method according to claim 22, further comprising:
   a consecutive cluster storing step of storing written data into consecutive clusters at the time of writing of data; and
   a consecutive cluster write protect writing step of causing the cluster write protect writing step, after writing of data, to apply write protection to all of at least one or more consecutive clusters in which data is stored, when the data is written by the consecutive cluster storing step.

24. The storage managing method according to claim 21, wherein said block boundary matching step matches the boundary between a management information region of the storage medium and the cluster with a boundary of at least one or more consecutive blocks.

25. The storage managing method according to claim 24, wherein the management region is a root directory entry region of the storage medium.

26. A storage managing apparatus for managing data storage of a storage medium, comprising:
   a control unit configured to control a storage medium that is capable of applying write protection to data in units of a block having a predetermined size; and
   a block boundary matching unit configured to match a boundary of a cluster, which is a minimum data unit in a data region of the storage medium, with a boundary of at least one or more consecutive blocks,
   wherein the control unit controls the storage medium to cancel write protection applied to a write protected block.

27. The storage managing apparatus according to claim 26, wherein said block boundary matching unit matches the boundary between a management information region of the storage medium and the cluster with a boundary of at least one or more consecutive blocks.

28. The storage managing apparatus according to claim 27, wherein the management region is a root directory entry region of the storage medium.

29. A storage managing method for managing data storage of a storage medium, comprising:
   a block boundary matching step of matching a boundary of a cluster, which is a minimum data unit in a data region of a storage medium that is capable of applying write protection to data in units of a block having a predetermined size, with a boundary of at least one or more consecutive blocks; and
   a control step of controlling write protection applied to a storage medium having a block whose boundary is matched by the block boundary matching step,
   wherein the control step includes a step of controlling the storage medium to cancel write protection applied to a write protected block.

30. Computer-executable process steps for causing a computer to execute the method of claim 29.

31. A computer-readable storage medium for storing the compute-executable process steps of claim 30.

32. The storage managing method according to claim 29, wherein said block boundary matching step matches the boundary between a management information region of the storage medium and the cluster with a boundary of at least one or more consecutive blocks.

33. The storage managing method according to claim 32, wherein the management region is a root directory entry region of the storage medium.

34. A storage managing method for managing data storage of a storage medium, comprising:

a block boundary matching step of matching a boundary of a cluster, which is a minimum data unit in a data region of a storage medium that is capable of applying write protection to data in units of a block having a predetermined size, with a boundary of at least one or more consecutive blocks; and a control step of controlling write protection applied to a storage medium having a block whose boundary is matched by the block boundary matching step, wherein the control step includes a step of controlling the storage medium, after writing of data, to apply write protection to all of the at least one or more consecutive blocks in which data is stored at the time of writing of data.

35. The storage managing method according to claim 34, wherein said block boundary matching step matches the boundary between a management information region of the storage medium and the cluster with a boundary of at least one or more consecutive blocks.

36. The storage managing method according to claim 35, wherein the management region is a root directory entry region of the storage medium.

37. A storage managing system for managing data storage of a storage medium, comprising:

a write protecting unit configured to apply write protection to data in units of a block having a predetermined size;

a block boundary matching unit configured to match a boundary of a cluster, which is a minimum data unit in a data region of the storage medium, with a boundary of at least one or more consecutive blocks and the start position of the cluster with the boundary of at least one or more consecutive blocks; and a write protect canceling unit configured to cancel write protection applied to a block write protected by the write protecting unit.

38. The storage managing method according to claim 37, wherein the start position is an end of a root directory entry region of the storage medium.

39. A storage managing method for managing data storage of a storage medium, comprising:

a block boundary matching step of matching a boundary between a management information region of the storage medium and a cluster, which is a minimum data unit in a data region of the storage medium, with a boundary of at least one or more consecutive blocks to be protected, each of blocks having a predetermined size and the start position of the cluster with the boundary of the boundary of at least one or more consecutive blocks;

a write protecting step of applying write protection to data in units of the block; and a write protect canceling step of canceling write protection applied to a block write protected by the write protecting step.

40. The storage managing method according to claim 39, wherein the start position is an end of a root directory entry region of the storage medium.

41. A computer-readable storage medium having stored thereon computer process steps causing a computer to execute the method of claim 39.

* * * * *